US008886530B2

(12) United States Patent
Nakadai

(10) Patent No.: US 8,886,530 B2
(45) Date of Patent: Nov. 11, 2014

(54) DISPLAYING TEXT AND DIRECTION OF AN UTTERANCE COMBINED WITH AN IMAGE OF A SOUND SOURCE

(75) Inventor: Kazuhiro Nakadai, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 224 days.

(21) Appl. No.: 13/529,585

(22) Filed: Jun. 21, 2012

(65) Prior Publication Data

US 2012/0330659 A1 Dec. 27, 2012

Related U.S. Application Data

(60) Provisional application No. 61/500,653, filed on Feb. 24, 2011.

(51) Int. Cl.

| | |
|---|---|
| ***G10L 15/00*** | (2013.01) |
| ***G10L 15/26*** | (2006.01) |
| ***G10L 21/00*** | (2013.01) |
| ***G10L 25/00*** | (2013.01) |
| ***G10L 21/06*** | (2013.01) |

(52) U.S. Cl.

CPC ....... *G10L 21/06* (2013.01); *G01L 2021/02166* (2013.01)

USPC ............................ 704/235; 704/231; 704/270

(58) Field of Classification Search

USPC .................................. 704/231–257, 270–275

See application file for complete search history.

(56) References Cited

U.S. PATENT DOCUMENTS

| | | | | |
|---|---|---|---|---|
| 6,603,858 | B1 * | 8/2003 | Raicevich et al. | 381/57 |
| 2003/0009329 | A1 * | 1/2003 | Stahl et al. | 704/233 |
| 2003/0218638 | A1 * | 11/2003 | Goose et al. | 345/850 |
| 2004/0258255 | A1 * | 12/2004 | Zhang et al. | 381/92 |
| 2007/0208569 | A1 * | 9/2007 | Subramanian et al. | 704/270 |
| 2009/0220107 | A1 * | 9/2009 | Every et al. | 381/94.7 |
| 2011/0276901 | A1 * | 11/2011 | Zambetti et al. | 715/753 |

FOREIGN PATENT DOCUMENTS

| | | |
|---|---|---|
| JP | 2008-197650 | 8/2008 |

* cited by examiner

*Primary Examiner* — Jesse Pullias

(74) *Attorney, Agent, or Firm* — Nelson Mullins Riley & Scarborough LLP; Anthony A. Laurentano

(57) ABSTRACT

An information processing device includes a display data creating unit configured to create display data including characters representing the content of an utterance based on a sound and a symbol surrounding the characters and indicating a first direction, and an image combining unit configured to determine the position of the display data based on a display position of an image representing a sound source of the utterance, and to combine the display data and the image of the sound source so that an orientation in which the sound is radiated is matched with the first direction.

7 Claims, 13 Drawing Sheets

DISPLAYING TEXT AND DIRECTION OF AN UTTERANCE COMBINED WITH AN IMAGE OF A SOUND SOURCE

CROSS REFERENCE TO RELATED APPLICATIONS

This is a non-provisional patent application claiming benefit from U.S. provisional patent application Ser. No. 61/500,653, filed Jun. 24, 2011, the contents of which are entirely incorporated herein by reference.

BACKGROUND OF THE INVENTION

1. Field of the Invention

The present invention relates to an information processing device, an information processing system, an information processing method, and an information processing program.

2. Description of Related Art

With the advancement of sound processing techniques, recording or remotely transmitting sound environments along with the content of an utterance has been attempted. In general, the voice of an utterer is mixed with sounds such as voices of other people or operation sounds of apparatuses arriving from a plurality of sound sources. A viewer identifies the sounds and then understands the content of an utterance. Therefore, techniques of separating sound data of the respective sound sources and showing listener information represented by the separated sound data have been proposed.

For example, in a sound data recording and reproducing device described in JP-A-2008-197650, sound data is acquired, the directions in which sound sources are present are specified, the sound data of the respective sound sources are separated, time-series sound data of the respective sound sources are stored, stream data of the sound representing the direction of a predetermined sound source at a predetermined time is created, and the prepared stream data is displayed for a viewer. When the displayed stream data is selected by the viewer, the sound data recording and reproducing device reproduces the sound data of the selected stream data.

SUMMARY OF THE INVENTION

However, when reproducing a sound, the sound data recording and reproducing device described in JP-A-2008-197650 separately displays the direction of the sound source of the sound and content of the sound data. For example, when reproducing sounds uttered by a plurality of titterers, it is difficult for a viewer to intuitively understand utterance situations such as which sound represents what kind of utterance.

The invention is made in consideration of the above-mentioned circumstances and an object thereof is to provide an information processing device, an information processing system, an information processing method, and an information processing program, which can allow a viewer to easily understand utterance situations.

(1) According to a first aspect of the invention, there is provided an information processing device including: a display data creating unit configured to create display data including characters representing the content of an utterance based on a sound and a symbol surrounding the characters and indicating a first direction; and an image combining unit configured to determine the position of the display data based on a display position of an image representing a sound source of the utterance, and to combine the display data and the image of the sound source so that an orientation in which the sound is radiated is matched with the first direction.

(2) The information processing device may further include: an image acquiring unit configured to acquire an image representing the sound source; and a data input unit configured to input a viewpoint which is a position where the image is observed, and the image combining unit may perform changing of the viewpoint based on the viewpoint input from the data input unit on the display data created by the display data creating unit and may combine the display data, of which the viewpoint is changed, with the image acquired by the image acquiring unit.

(3) The information processing device may further include a position detecting unit configured to detect its own position, and the data input unit may input the position detected by the position detecting unit as the viewpoint.

(4) The information processing device may further include an emotion estimating unit configured to estimate an emotion of a speaker producing the sound of the utterance, and the display data creating unit may change the display form of the symbol based on the emotion estimated by the emotion estimating unit.

(5) In the information processing device, the display data creating unit may determine the size of the characters representing the contents of the utterance based on the distance from the viewpoint to the position of the sound source.

(6) In the information processing device, the display data creating unit may determine the time at which the symbol is displayed based on the number of characters included in the display data.

(7) According to a second aspect of the invention, there is provided an information processing system including: a sound source position estimating unit configured to estimate the position of a sound source; an orientation estimating unit configured to estimate an orientation in which the sound source radiates a sound wave; a sound recognizing unit configured to recognize the content of an utterance from the sound source; a display data creating unit configured to create display data including characters representing the content of an utterance recognized by the sound recognizing unit and a symbol surrounding the characters and indicating a first direction; and an image combining unit configured to determine the position of the display data based on a display position of an image representing the sound source of the utterance, and to combine the display data and the image of the sound source so that an orientation in which the sound is radiated is matched with the first direction.

(8) The information processing system may further include an imaging unit configured to capture an image representing the sound source of the utterance.

(9) According to a third aspect of the invention, there is provided an information processing method in an information processing device, including the steps of: creating display data including characters representing the content of an utterance based on a sound and a symbol surrounding the characters and indicating a first direction; and determining the position of the display data based on a display position of an image representing a sound source of the utterance and combining the display data and the image of the sound source so that an orientation in which the sound is radiated is matched with the first direction.

(10) According to a fourth aspect of the invention, there is provided an information processing program causing a computer of an information processing device to perform the sequences of: creating display data including characters representing the content of an utterance based on a sound and a symbol surrounding the characters and indicating a first direction; and determining the position of the display data based on a display position of an image representing a sound source of the utterance and combining the display data and the image of the sound source so that an orientation in which the sound is radiated is matched with the first direction.

According to the configurations of (1), (7), (9), and (10), it is possible to allow a viewer to easily understand utterance situations.

According to the configuration of (2), it is possible to allow a viewer to intuitively understand the utterance situation of a sound source which is an object displayed in an acquired image.

According to the configuration of (3), it is possible to allow a viewer to understand the position of a sound source and the orientation of a sound.

According to the configuration of (4), it is possible to allow a viewer to visually understand the emotion of a speaker as a sound source.

According to the configuration of (5), it is possible to allow a viewer to intuitively understand the distance from the viewpoint to the sound source.

According to the configuration of (6), it is possible to give a viewer the time sufficient to understand the content of an utterance depending on the number of characters representing the content of an utterance.

According to the configuration of (8), it is possible to allow a viewer to view an image of a speaker as a sound source, and to further easily understand the situation.

DETAILED DESCRIPTION OF THE INVENTION

Hereinafter, embodiments of the invention will be described in detail with reference to the accompanying drawings.

First Embodiment

Figure 1:
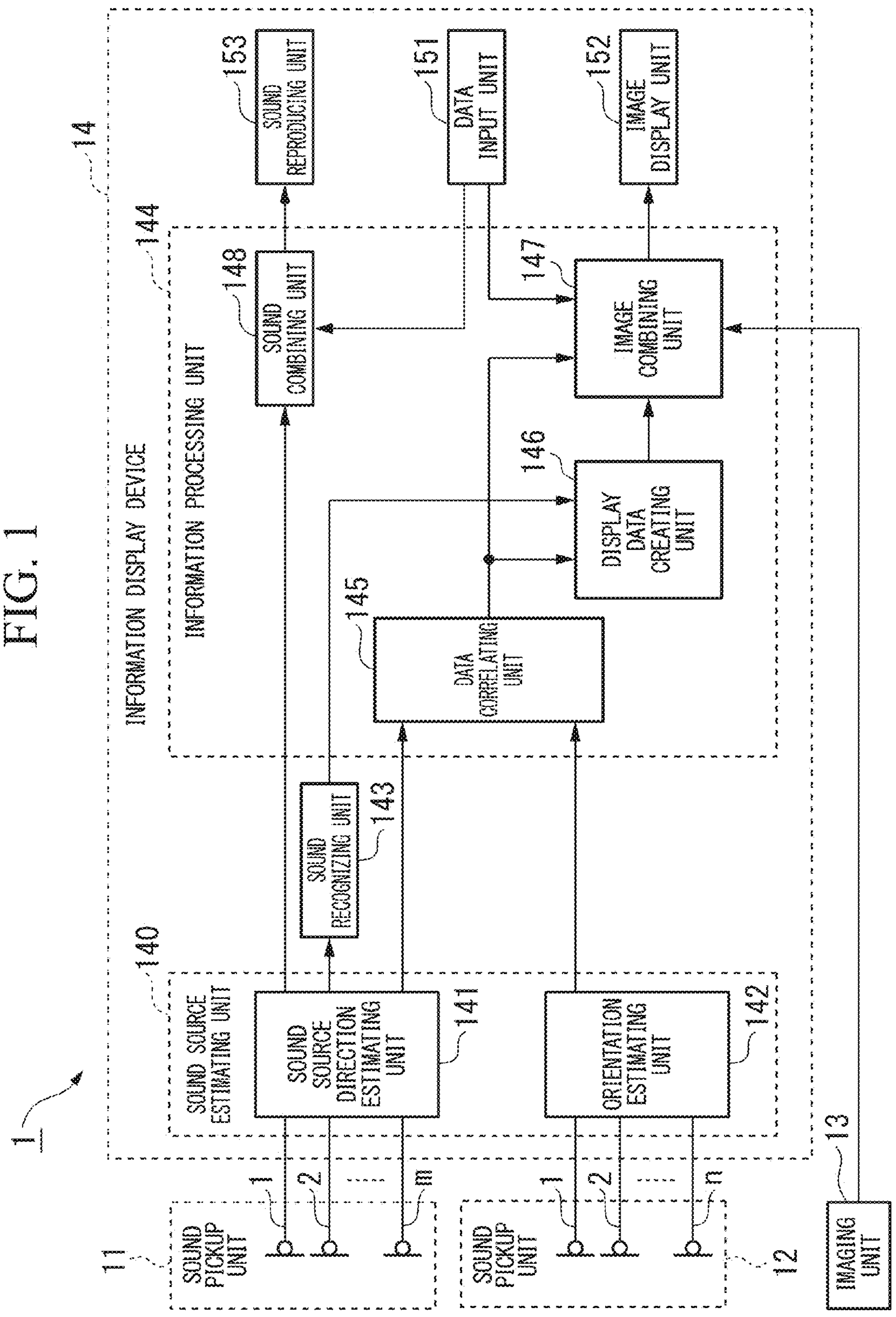
FIG. 1 is a diagram schematically illustrating an information display system according to a first embodiment of the invention.

FIG. 1 is a diagram illustrating an information display system (information processing system) 1 according to a first embodiment of the invention.

The information display system 1 includes sound pickup units 11 and 12, an imaging unit (image acquiring unit) 13, and an information display device 14.

The sound pickup units 11 and 12 output m channels of sound signals and n channels of sound signals, respectively, to the information display device 14. Here, m and n are integers greater than 1. Each of the sound pickup units 11 and 12 includes a microphone converting the vibration of a sound wave arriving for each channel into a sound signal as an electric signal. The microphone is, for example, an omnidirectional microphone. The sound pickup unit 11 may be, for example, a microphone array disposed on a head of a robot. In the microphone array, the microphones are arranged around the circumference centered on the top of the head of the robot at a constant pitch. The sound pickup unit 12 may be, for example, a microphone array disposed on the surface of an inner wall of a room. In the microphone array, the microphones are arranged to cover the horizontal surface of the room at a constant pitch and with a constant height from the bottom. The arrangement of the microphones will be described later.

The imaging unit 13 generates an image signal representing a captured image for each frame and outputs the generated image signal to the information display device 14. The imaging unit 13 is, for example, a CCD (Charge-Coupled Device) camera or a CMOS (Complementary Metal Oxide Semiconductor) camera. The imaging unit 13 may be a stereoscopic camera having a plurality of (for example, two) optical systems. In the stereoscopic camera, the optical systems are disposed at positions separated by a constant gap and the optical axes of the optical systems are parallel to each other. The optical systems generate image signals representing images of the respective viewpoints, for example, a left image signal and a right image signal. The imaging unit 13 outputs the generated left image signal and right image signal to the information display device 14.

The information display device 14 includes a sound source estimating unit 140, a sound recognizing unit 143, an information processing unit 144, a data input unit 151, an image display unit 152, and a sound reproducing unit 153.

The sound source estimating unit 140 estimates directions of sound sources, orientations of the sound sources, and components of the sound signals occupied by the sound sources based on the input sound signals of a plurality of channels. The component occupied by a sound source means a sound signal based on a sound wave arriving from only the sound source, that is, a sound signal observed when it is assumed that no sound wave arrives from the other sound sources.

In the example shown in FIG. 1, the sound source estimating unit 140 includes a sound source direction estimating unit 141 and an orientation estimating unit 142.

The sound source direction estimating unit 141 estimates the directions of the sound sources (sound source directions) based on the m channels of sound signals input from the sound pickup unit 11. The sound source direction estimated by the sound source direction estimating unit 141 is, for example, a direction in the horizontal plane with respect to a direction from the barycenter of the positions of m microphones of the sound pickup unit 11 to a predetermined microphone out of the m microphones.

The sound source direction estimating unit 141 separates sound signals indicating components based on the respective sound sources from the m channels of sound signals. Hereinafter, a sound signal for each sound source, that is, a sound signal indicating the component based on each sound source, is referred to as a sound-source signal.

The sound source direction estimating unit 141 uses a sound source direction estimating method such as a MUSIC (Multiple Signal Classification) method and a WDS-BF (Weighted Delay and Sum Beam Forming) method to estimate a sound source direction.

The sound source direction estimating unit 141 uses a sound source separating method such as a sound source separating method described in JP-A-2012-42953 to separate the sound-source signals.

The sound source direction estimating unit 141 creates sound source direction information indicating the directions of the sound sources and outputs the created sound source direction information to the information processing unit 144. The sound source direction estimating unit 141 outputs the sound-source signals of the sound sources to the sound recognizing unit 143 and the information processing unit 144. The direction indicated by the created sound source direction information is a direction with respect to a predetermined reference position, for example, the barycenter of the positions of m microphones of the sound pickup unit 11.

The orientation estimating unit 142 estimates the orientation (orientation) and the position of the respective sound sources based on the n channels of sound signals input from the sound pickup unit 12. The orientation is a direction in which the power of a sound wave radiated from a sound source is the largest. That is, the orientation is a symbol of the directivity of a sound source. The orientation estimating unit 142 uses an orientation (described as "the direction of a sound source" in the publication) and sound source position estimating method performed by a sound source characteristic estimating device described in PCT International Publication Pamphlet 2007/013525 to estimate the orientation and the position of the respective sound sources.

The orientation estimating unit 142 includes, for example, a plurality of beam formers outputting weighted signals obtained by weighting n channels of sound signals by the use of a weighting function of each channel. Each beam former calculates an output value in a direction by the use of a weighting function having a unit directivity characteristic (radiation characteristic) corresponding to any one direction from a certain position in a space. The orientation estimating unit 142 determines the orientation and the position corresponding to the beam former having the maximum output value out of the plurality of beam formers.

The orientation estimating unit 142 determines whether the orientation of a sound source can be estimated. When the estimation fails (the estimation is disabled), it means that the directivity of the sound source is smaller than a predetermined degree. The disabled estimation means that when the power of a sound wave of the sound source (directional power) is detected for each direction, the ratio (the maximum power ratio) of the maximum value of the directional power to the average value of the directional power is smaller than a predetermined value (for example, 3 dB). On the contrary, the orientation estimating unit 142 determines that the estimation succeeds (the estimation is enabled), when the maximum power ratio is equal to or greater than the predetermined value.

The orientation estimating unit 142 creates orientation information indicating whether the orientation of each sound source can be estimated and the estimated orientation and creates position information indicating the estimated position of each sound source. The orientation estimating unit 142 outputs the created orientation information and the created position information to the information processing unit 144. The position indicated by the created position information is expressed in a coordinate system with a predetermined reference position, for example, with an end of a room (hereinafter, referred to as a listening room) in which n microphones of the sound pickup unit 12 as a reference.

The sound recognizing unit 143 recognizes the content of an utterance indicated by the sound-source signal of each sound source input from the sound source direction estimating unit 141 through the use of a known sound recognition method.

Here, the sound recognizing unit 143 detects that it is soundless when the intensity (for example, power) of a sound signal is smaller than a predetermined value for a time longer than a predetermined time (for example, 1 second). The sound recognizing unit 143 determines that an interval interposed between the soundless states is an utterance interval. The sound recognizing unit 143 creates sound recognition information indicating the content of an utterance based on the sound-source signal for each utterance interval.

The sound recognizing unit 143 includes a storage unit in which an acoustic model (for example, hidden Markov model (HMM)) and a language model (for example, a word dictionary and a descriptive grammar) are stored. The sound recognizing unit 143 calculates an acoustic feature quantity of the input sound-source signal and determines a phoneme sequence including phonemes by the use of the acoustic model stored in the storage unit for the calculated acoustic feature quantity. The sound recognizing unit 143 determines a word sequence by the use of the language model stored in the storage unit for the determined phoneme sequence. The determined word sequence is sound recognition information indicating the content of an utterance. The sound recognizing unit 143 outputs the sound recognition information to the information processing unit 144.

The information processing unit 144 includes a data correlating unit 145, a display data creating unit 146, an image combining unit 147, and a sound combining unit 148.

The data correlating unit 145 correlates the sound source direction information for each sound source input from the sound source direction estimating unit 141 with the orientation information and the position information for each sound source input from the orientation estimating unit 142 for each sound source. Here, the data correlating unit 145 determines whether the sound source direction indicated by the input position information is equal or similar to the sound source direction indicated by the input sound source direction information using any one side (for example, an end of the listening room) of the above-mentioned reference position as a reference coordinate. The data correlating unit 145 determines that both are similar when the absolute value of the difference between the sound source directions is smaller than a predetermined direction error. When it is determined that both are equal to or similar to each other, the data correlating unit 145 determines that the sound source indicated by the input position information is the same as the sound source indicated by the input sound source direction information.

The data correlating unit 145 correlates the input sound source direction information with the orientation information for the sound source which is determined to be the same and outputs the correlated information to the display data creating unit 146 and the image combining unit 147.

The display data creating unit 146 reads symbol data from the storage unit of the display data creating unit 146 based on the orientation information input from the data correlating unit 145. The display data creating unit 146 arranges a character string indicated by the sound recognition information input from the sound recognizing unit 143 in a character display area of the symbol data and creates display data indicating the symbol in which the character string is arranged.

The display data creating unit 146 creates arrangement position information indicating the position at which the display data is arranged for each sound source based on the position information input from the data correlating unit 145. The display data creating unit 146 correlates the arrangement position information with the created display data for each sound source and outputs the correlated information to the image combining unit 147.

The configuration of the display data creating unit 146, the symbol data, the display data, and the arrangement position information will be described later.

The image combining unit 147 creates display data arrangement information based on the display data and the arrangement position information input from the display data creating unit 146. For example, when the symbol indicated by the display data is an arrow, the image combining unit 147 arranges the arrow so that the arrow is directed in the orientation based on the orientation information input from the data correlating unit 145. The image combining unit 147 creates a display data image signal indicating an image of the symbol observed from the viewpoint of the imaging unit 13 based on the created display data arrangement information. The image combining unit 147 combines the created display data image signal and the image signal input from the imaging unit 13 to create a display image signal.

The image combining unit 147 converts the coordinates of the created display image signal to create a display image signal observed from the viewpoint indicated by the viewpoint information input from the data input unit 151. The image combining unit 147 outputs the created display image signal to the image display unit 152.

The configuration of the image combining unit 147, the display data arrangement information, and the display image signal will be described later.

The sound combining unit 148 receives the sound source direction information and the sound-source signal for each sound source from the sound source direction estimating unit 141. The sound combining unit 148 may synthesize a one channels of sound signal by combining the sound-source signal for each sound source input from the sound source direction estimating unit 141 for the sound sources and may output the combined one channels of sound signal to the sound reproducing unit 153.

The sound combining unit 148 may combine two-channel stereo sound signals and may output the combined two channels of sound signal to the sound reproducing unit 153.

Here, the sound combining unit 148 includes a storage unit in which head related transfer functions are stored in advance for the directions of the sound sources separated from a certain listening point (viewpoint) by a predetermined distance d. The head related transfer function is a filter coefficient indicating the transfer characteristics of a sound wave from a sound source to the right and left ears (channels) of a viewer located at a certain listening point (viewpoint). The sound combining unit 148 calculates a sound source position separated from the above-mentioned reference position by a distance d and indicated by the sound source direction indicated by the input sound source direction information and calculates the direction from a predetermined viewpoint (the focal point of the optical system of the imaging unit 13) as a listening point. The sound combining unit 148 reads the head related transfer function corresponding to the calculated direction from the storage unit of the sound combining unit 148, performs a convolution operation of convolving the read head related transfer function of the right and left ears on the corresponding sound-source signal, and creates the sound-source signals of the right and left channels. The sound combining unit 148 combines the sound signals of the right and left channels by adding the sound-source signals created for the sound sources for each channel. Accordingly, sounds arriving from the sound sources are reproduced by the right and left ears of the viewer located at a listening point. As a result, the viewer perceives the sounds from the sound sources in the sound source directions based on the listening point.

The sound combining unit 148 may create two channels of sound signals based on the viewpoint information input from the data input unit 151 instead of the two channels of sound signals based on the viewpoints of the optical systems of the imaging unit 13 (change of viewpoint). Here, the sound combining unit 148 calculates the sound source position separated from the reference position by a distance d and indicated by the sound source direction indicated by the input sound source direction information and calculates the direction from the viewpoint, which is the listening point for the calculated sound source position, input from the data input unit 151. The sound combining unit 148 combines the sound signals of the right and left channels by using the head related transfer function corresponding to the calculated direction instead of the above-mentioned head related transfer function.

The data input unit 151 receives a user's operation input and inputs viewpoint information indicating a viewpoint and a gaze direction. The viewpoint is a virtual position at which a sound source or an object is viewed. The gaze direction is a virtual direction in which a sound source or an object is gazed at. The data input unit 151 includes a pointing device such as a mouse or a joy stick which can input position information by manipulation. The data input unit 151 outputs the input viewpoint information to the image combining unit 147 and the sound combining unit 148.

The image display unit 152 displays an image indicated by the image signal input from the image combining unit 147. When the input image signal is a planar image signal indicating an image of one viewpoint, the image display unit 152 may be a liquid crystal display device displaying a planar image. When the input image signal is a stereoscopic image including images of a plurality of viewpoints, for example, two viewpoints, the image display unit 152 may be a three-dimensional display device displaying a stereoscopic image. The image display unit 152 may be, for example, a head-mounted display (HMD). The image display unit 152 may be a stationary type, a type demanding that a user should wear glasses, or a type not demanding that a user should wear glasses, as long as it is a display displaying the images of the viewpoints for the corresponding eyes.

The sound reproducing unit 153 reproduces the sound indicated by the sound signal input from the sound combining unit 148. When the input sound signal is a monoral sound signal indicating a sound of one channel, the sound reproducing unit 153 may be a speaker reproducing the sound of one channel. When the input sound signal is a stereo sound signal indicating sounds of a plurality of channels, for example, two channels, the sound reproducing unit 153 may be a head phone. The head phone may be built in the head-mounted display.

Configuration of Display Data Creating Unit

The sound recognition information form the sound recognizing unit 143 and the orientation information and the sound source direction information from the data correlating unit 145 are input to the display data creating unit 146. The display data creating unit 146 includes a storage unit in which symbol data indicating a symbol is stored. The symbol is a figure surrounding an area (character display area) in which characters are displayed as a part of an image. Examples of the figure surrounding the character display area include an arrow and a speech balloon and the outer edge (outline) thereof is formed of a line drawing expressed by segments. Here, a first predetermined signal value is set for the coordinates corresponding to the outer edge and a second predetermined signal value is set for the coordinates of the other area. Regarding the first signal value, the signal value of red is 255 and the signal values of the other colors are 0, for example, in a 8-bit RGB color coordinate system. A third predetermined signal value is set for the background part surrounded with the outer edge. The third signal value is a signal value of the same color as the first signal value and is a signal value smaller than the first signal value. Regarding the third signal value, the signal value of red is 64 and the signal values of the other colors are 0, for example, in the 8-bit RGB color coordinate system. The display data creating unit 146 may determine signal values indicating different colors depending on the sound sources. For example, the display data creating unit 146 determines a signal value corresponding to a color other than red, for example, green, for each coordinate corresponding to the outer edge for another sound source.

The storage unit stores symbol data (direction indicating symbol data) on a symbol indicating a specific direction (for example, the orientation of a sound source) and symbol data (direction non-indicating symbol data) on a symbol not indicating a specific direction. In the following description, an image of an arrow is exemplified as the direction indicating symbol data and an image of a speech balloon is exemplified as the direction non-indicating symbol data. The symbol data indicating an image of an arrow is referred to as arrow data and the symbol data indicating an image of a speech balloon is referred to as speech balloon data. Examples of the image of an arrow and the image of a speech balloon will be described later.

When the input orientation information indicates the enabled estimation, the display data creating unit 146 reads the arrow data from the storage unit of the display data creating unit 146. When the input orientation information indicates the disabled estimation, the display data creating unit 146 reads the speech balloon data from the storage unit of the display data creating unit 146.

The display data creating unit 146 may set the size of the character display area to a predetermined constant size, or may determine the size of the character display area depending on the size of the characters to be displayed. Since the character display area is surrounded with the outer edge of the symbol with a blank space of a predetermined width as described later, the display data creating unit 146 may determine the total size of the symbol by determining the size of the character display area.

First, the display data creating unit 146 determines the size of the characters depending on the relative position to the corresponding sound source. Specifically, the display data creating unit 146 subtracts the coordinate value $p^r$ of the viewpoint indicated by the viewpoint information from the coordinate value $p^s$ of the position corresponding to the sound source direction information and calculates the coordinate value $p^{s'}$ of the relative position to the sound source. The position of the viewpoint indicated by the viewpoint information is, for example, the position of the viewpoint of the optical system of the imaging unit 13. When calculating the coordinate value $p^s$, it is assumed that the sound source is present within a predetermined distance from the reference position.

The display data creating unit 146 calculates the depth $d_h$ from the viewpoint based on the calculated coordinate value to the corresponding sound source. The display data creating unit 146 calculates the size of the characters so that as the calculated depth increases, the size of the characters decreases. The display data creating unit 146 calculates the size (font size) s of the characters, for example, using Equation 1.

$$s = (s_b - s_f)\frac{d_h - d_f}{d_b - d_f} + s_f \tag{1}$$

In Equation 1, $s_b$ and $_{sf}$ are predetermined real numbers indicating the maximum value and the minimum value of the size of the characters, respectively. The unit thereof is the number of pixels. $d_b$ and $d_f$ are predetermined real numbers indicating the threshold values of the depth, respectively. Here, $d_b$ is smaller than $d_f$. That is, Equation 1 represents that the font size s corresponding to the depth $d_h$ is calculated through the interpolation between the font size $s_b$ corresponding to the maximum value $d_b$ of the depth and the font size $s_f$ corresponding to the minimum value $d_f$ of the depth. Here, the display data creating unit 146 sets $s=s_b$ when $d_h$ is equal to $d_b$ or smaller than $d_b$, and determines $s=s_f$ when $d_h$ is equal to $d_f$ or larger than $d_f$.

Accordingly, the font size is determined so that as the depth from the viewpoint increases (that is, gets farther), the font size decreases. The depth is a value serving as a reference of the distance from the viewpoint.

The display data creating unit 146 determines the character display area depending on the height and the width of one character, the predetermined number of characters per row, and the number of rows which correspond to the determined font size. The display data creating unit 146 may determine the character display area by counting the number of characters included in the character string indicated by the sound recognition information input at a time and setting the counted number of characters as the number of display characters. Here, when the counted number of characters is greater than the maximum value (the maximum number of display characters) of the predetermined number of characters, the maximum number of display characters is set as the number of display characters.

The display data creating unit 146 arranges the character string indicated by the sound recognition information in the character display area of the symbol data and creates display data indicating the symbol in which the character string is arranged. Here, the display data creating unit 146 arranges the characters included in the character string indicated by the sound recognition information in the character display area from the left end to the right end of each row in the order in which the characters are input to the display data creating unit 146 until the maximum number of display characters is reached.

The display data creating unit 146 deletes the characters arranged in the character display area after a predetermined time passes, and arranges the characters included in the character string indicated by the next-input sound recognition information. Here, the display data creating unit 146 sets the signal value of the area in which the characters are arranged to the same value (signal value 1) as the outer edge.

When the character string indicated by the sound recognition information exceeds the maximum number of display characters, the display data creating unit 146 may arrange the character string so as to be inserted from the right side of the character display area and to be deleted from the left side. When the number of rows is 1, the display data creating unit 146 arranges new characters at the right end of the character display area, shifts the character string to the left by one character at a predetermined time interval, and deletes the character at the left end.

The display data creating unit 146 may keep the characters arranged when new sound recognition information is not input from the sound recognizing unit 143, but may delete the arranged characters after a certain time (display time) passes after the characters are arranged. Here, the display data creating unit 146 determines the display time so as to elongate the display time as the number of characters or words included in the character string indicated by the sound recognition information increases. For example, in the case of Japanese, the display time is set to 3+0.2×l seconds (where l is an integer value indicating the number of characters).

The display data creating unit 146 sets the reference point of the symbol indicated by the created display data as the arrangement position of the display data and as a position separated by a predetermined distance h in a predetermined direction (for example, to the upside or the downside) from the position indicated by the position information of the sound source. The reference point of the symbol is a point representing the position of the symbol, for example, the anchor point of an arrow or the top point of a speech balloon. The display data creating unit 146 creates the arrangement position information indicating the determined arrangement position for each sound source. Accordingly, it is possible to display that the symbol is an image related to the corresponding sound source and to avoid the hiding of the image related to the sound source. When the number of sound sources is two or more, the display data creating unit 146 changes the distance h from the sound source so that the areas in which the display data for each sound source is displayed do not overlap with each other and the distance between the reference point of each sound source and the position indicated by the position information is the minimum.

The display data creating unit 146 correlates the created display data and the arrangement position information for each sound source and outputs the correlated result to the image combining unit 147.

When the symbol indicated by the display data is an image of an arrow, the display data creating unit 146 correlates the created display data, the arrangement position information, and the orientation information for each sound source and outputs the correlated result to the image combining unit 147. When the symbol indicated by the display data is an image of a speech balloon, the display data creating unit 146 correlates the created display data and the arrangement position information and outputs the correlated result to the image combining unit 147. In this case, the display data creating unit 146 does not output the orientation information.

Configuration of Image Combining Unit

The image combining unit 147 receives the display data, the arrangement position information, and the orientation information from the display data creating unit 146 and receives an image signal from the imaging unit 13. Here, as described above, the orientation information may not be input.

The image combining unit 147 creates display data arrangement information in which the symbol indicated by the input display data is arranged at the arrangement position indicated by the arrangement position information. When the symbol indicated by the display data is an arrow, the image combining unit 147 arranges the arrow so that the arrow is directed in the orientation based on the orientation information. The image combining unit 147 creates a display data image signal indicating the image of the symbol, which is observed from the position of a certain viewpoint (for example, the position of the viewpoint of the optical system of the imaging unit 13), based on the display data arrangement information.

Here, the arrangement position information and the orientation information are expressed in a three-dimensional coordinate system with the above-mentioned reference coordinate as a reference, the image combining unit 147 converts the coordinate values of elements indicated by the created display data arrangement information into a coordinate system with the position of the viewpoint as a reference. For example, the image combining unit 147 converts the coordinate value ($X_o$, $Y_o$, $Z_o$) based on the world coordinate system displayed by the reference coordinate into the coordinate value ($X_c$, $Y_c$, $Z_c$) based on a camera coordinate system with the position of the viewpoint as a reference so as to satisfy Equation 2.

$$\begin{bmatrix} X_c \\ Y_c \\ Z_c \end{bmatrix} = R \begin{bmatrix} X_o \\ Y_o \\ Z_o \end{bmatrix} + T \tag{2}$$

In Equation 2, R represents a rotation matrix representing that the coordinate axes in the world coordinate system are rotated to the coordinate axes in the camera coordinate system and T represents a translation vector representing the displacement in position from the reference coordinate of the position (origin) of the viewpoint of the imaging unit 13. The image combining unit 147 creates the display data image signal by converting the coordinate-converted display data arrangement information into a two-dimensional image coordinate system, for example, using Equations 3.

$$u_c = f\frac{X_c}{Z_c},\ v_c = f\frac{Y_c}{Z_c} \tag{3}$$

Equations 3 represents that the coordinate value $X_o$ in the horizontal direction and the coordinate value $Y_o$ in the vertical direction out of the coordinate values in the world coordinate system are normalized with the ratio $Z_o$/f of the focal distance f and the coordinate value $Z_o$ in the depth direction and the coordinate value ($u_c$, $v_c$) in the camera coordinate system is calculated. The focal distance f is a focal distance of the optical system of the imaging unit 13.

When the coordinate value in the depth direction of the arrangement position indicated by the arrangement position information is negative, the horizontal direction after the coordinate conversion is performed is inverted from the horizontal direction when the display data is created. In this case, the image combining unit 147 inverts the horizontal direction of the character display area or the character string indicated by the display input before the coordinate conversion. When inverting the horizontal direction, the surrounding of the vertical symmetric axis passing through the center in the horizontal direction of the character display area is rotated by 180°. Accordingly, the characters constituting the character string indicated by the display data after the coordinate conversion are prevented from being arranged from the right to the left. The image combining unit 147 combines the image signal input from the imaging unit 13 and the display data image information to create a display image signal. Here, the image combining unit 147 performs the combination so that the display data image information has a priority. That is, when the signal value of the display data image information at a certain pixel is a signal value 1, the image combining unit 147 sets the signal value 1 as the signal value of the display image signal at the corresponding pixel. When the signal value of the display data image information at a certain pixel is a signal value 2, the image combining unit 147 sets the signal value of the input image signal at the corresponding pixel as the signal value of the display image signal at the corresponding pixel.

In this manner, the outer edge or the characters m the display data are preferentially displayed and the captured image is display in the other part. Accordingly, the inside of the symbol is displayed so as to be transparent.

As a result, the inside of the symbol is displayed so as to be transparent except for the part in which the characters are displayed.

When the signal value of the display data image information at a certain pixel is a signal value 2, the image combining unit 147 sets an intermediate signal value (for example, average value) between the signal value and the signal value of the input image signal at the corresponding pixel as the signal value of the display image signal at the corresponding pixel. Accordingly, the inside of the symbol is displayed so as to be semi-transparent except for the part in which the characters are displayed.

The image combining unit 147 may output the created display data image signal (planar image signal) to the image display unit 152.

The image combining unit 147 may combine two-viewpoint display image data image signals and may output the combined result to the image display unit 152. When two-viewpoint image signals including a left image signal and a right image signal are input from the imaging unit 13, the image combining unit 147 performs the above-mentioned process on an image signal of a certain viewpoint, for example, the left image signal, and creates the display data image signal.

The image combining unit 147 calculates a disparity value D based on the coordinate value $Z_c$ of the depth component in the corresponding display data arrangement information for each pixel of the created display data image signal. Here, the disparity value D and the coordinate value $Z_c$ satisfy the relationship of $D=B\cdot f/(p\cdot Z_c)$. Here, B represents a base length. The base length B is a distance between viewpoints of the imaging unit 13. p represents a pixel pitch.

The image combining unit 147 arranges the signal values of the pixels in the created display data image signal at positions shifted in the horizontal direction (to the right side) by the calculated disparity value to create the right display data image signal (hereinafter, referred to as right display data image signal).

The image combining unit 147 combines the created right display data image signal and the input right image signal to create a right display image signal. The process of creating the right display image signal is the same as the above-mentioned process of creating the display image signal.

The image combining unit 147 may output the display image signal for the input left image signal as a left image signal and the created right display image signal as a right image signal to the image display unit 152.

The image combining unit 147 may change the display image signal (two viewpoints) based on the viewpoints of the optical system of the imaging unit 13 to the display image signal (two viewpoints) based on the viewpoint information input from the data input unit 151 (change of viewpoint).

Here, the image combining unit 147 calculates the disparity value for each pixel, for example, by performing a block matching operation on the left display image signal and the right display image signal. The block matching is an operation of extracting a block in which the signal values in a predetermined area (block) including a pixel of interest of one image signal are similar from the other image signal. The image combining unit 147 calculates the coordinate value in the camera coordinate system corresponding to the respective pixels based on the calculated disparity values. The image combining unit 147 performs the coordinate conversion by translating the calculated coordinate values by the use of the relationship of Equation 2 so that the coordinate of the viewpoint indicated by the input viewpoint information is set as an origin and rotating the coordinate axes so that the gaze direction indicated by the viewpoint information is the depth direction. The image combining unit 147 calculates the coordinate values of the input viewpoint information by the use of the relationship of Equations 3. Accordingly, the left display image signal of which the coordinates are converted is created. The image combining unit 147 creates the right display image signal of which the coordinates are converted by calculating the disparity value for each pixel by the use of the calculated coordinate value of the depth component and arranging the corresponding pixels at positions shifted in the horizontal direction based on the calculated disparity values. The image combining unit 147 outputs the created left display image signal and the created right display image signal as the left image signal and the right image signal to the image display unit 152.

Arrangement of Sound Pickup Unit and Imaging Unit

An arrangement of the sound pickup units 11 and 12 and the imaging unit 13 according to the first embodiment will be described below.

Figure 2:
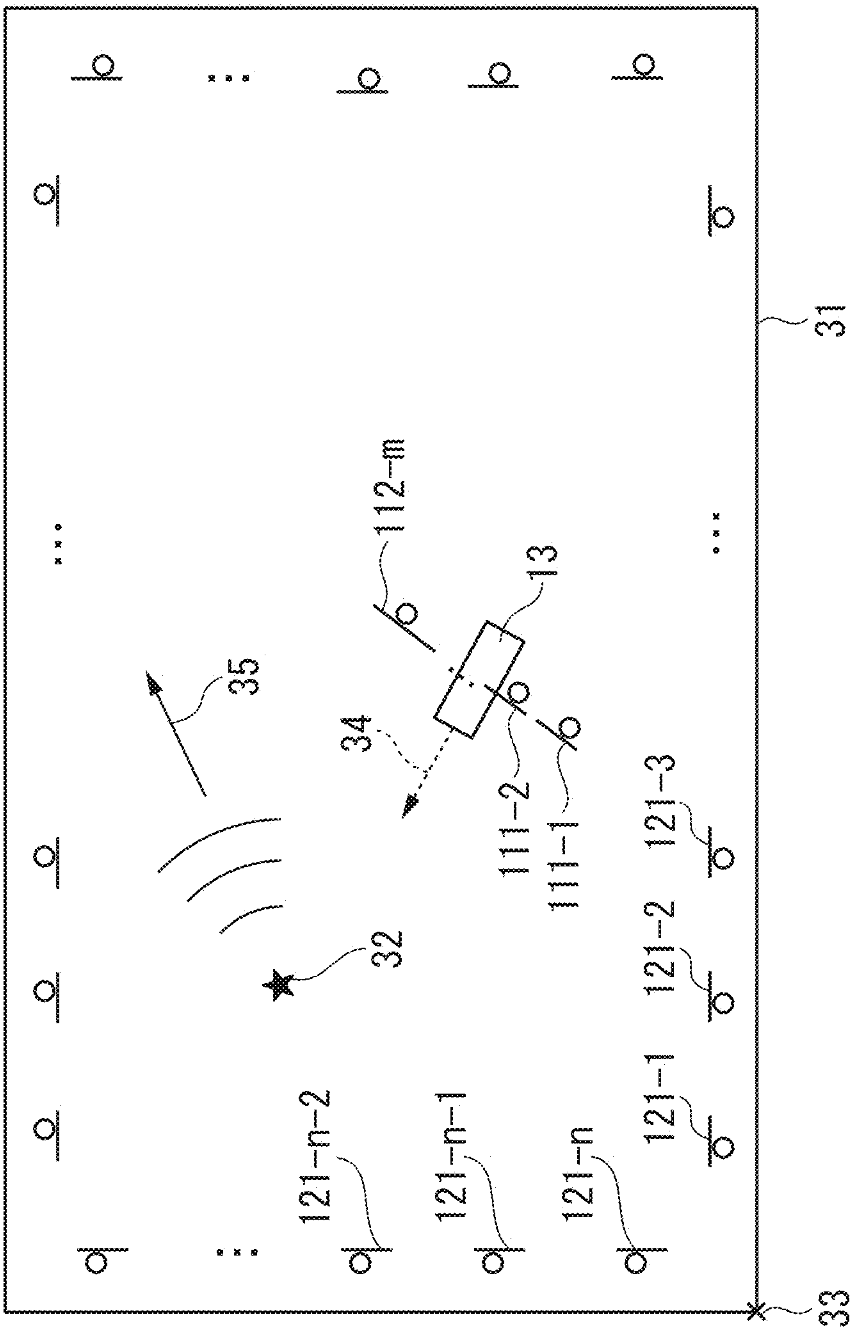
FIG. 2 is a conceptual diagram illustrating an example where a sound pickup unit and an imaging unit in the first embodiment are arranged.

FIG. 2 is a conceptual diagram illustrating an arrangement of the sound pickup units and the imaging unit according to the first embodiment.

The horizontally-long rectangle shown in FIG. 2 represents the inner wall surface of a sound pickup room 31. In FIG. 2, the position of a sound source 32 is shown by a star mark on the upper-left side of the rectangle and a reference position 33 is shown by an x mark at the lower-left end of the rectangle. The reference position 33 is a reference position used by the orientation estimating unit 142 to estimate a sound source position.

n microphones 121-1 to **121-*n* are arranged at the same height at a constant pitch on the inner wall surface of the sound pickup room so as to surround the overall circumference. These microphones are n microphones included in the sound pickup unit 12. The imaging unit 13 is shown in the vicinity of the center of the sound pickup room 31. The arrow 34 of a broken line with the imaging unit 13 as a start point indicates the direction of the optical axis of the optical system of the imaging unit 13. m microphones 111-1 to 111**-*m* are arranged in the vicinity of the imaging unit 13 at a constant pitch so that the barycenter thereof approaches the focal point (viewpoint) of the optical system of the imaging unit 13. These microphones are m microphones of the sound pickup unit 11.

Circular arcs centered on the sound source and the arrow 35 indicating the radial direction represent the orientation which is a direction in which the radiation level from the sound source is remarkable.

Example of Image of Arrow Indicated by Display Data

An example of an image of an arrow according to the first embodiment will be described below.

Figure 3:
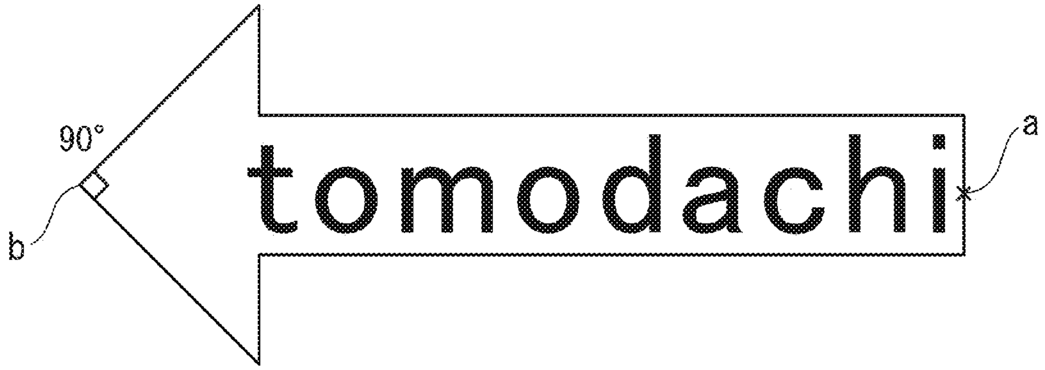
FIG. 3 is a diagram illustrating an example of an image of an arrow in the first embodiment.

FIG. 3 is a diagram illustrating an example of an image of an arrow according to the first embodiment.

The image of an arrow shown in FIG. 3 is configured so that the vertex b of a triangle is located at the left end and a rectangle contacts the bottom of the triangle. The area surrounded with the rectangle is a character display area. In the example shown in FIG. 3, a character string "tomodachi" meaning a "friend" in Japanese is displayed. The x mark displayed at the center of the right side of the rectangle a reference point (anchor point) a. The angle of the vertex b is a right angle. The overall shape of the arrow is vertically symmetric about a line passing through the reference point a and the vertex b. The image shown in FIG. 3 is an example of a symbol indicating a specific direction and the shape is not limited to the shape shown in the drawing.

Example of Image of Speech Balloon Indicated by Display Data

Figure 4:
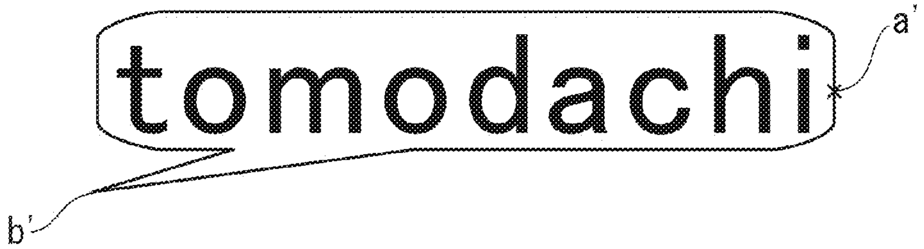
FIG. 4 is a diagram illustrating an example of an image of a speech balloon in the first embodiment.

FIG. 4 is a diagram illustrating an example of an image of a speech balloon according to the first embodiment.

The image of a speech balloon shown in FIG. 4 includes a rectangle of which the vertexes are rounded and a triangle having a vertex b' at a position separated downward from the lower-left end thereof. The area surrounded with the rectangle is a character display area. The character string shown in FIG. 4 is the same as the character string shown in FIG. 3. The x mark displayed at the center of the right side of the rectangle represents the reference point a'. The distance from the bottom of the rectangle to the vertex b' is represented by $h_b'$. The image shown in FIG. 4 is an example of a symbol not indicating a specific direction and the shape is not limited to the shape shown in the drawing.

Information Display Process

An information display process performed by the information display device 14 according to the first embodiment will be described below.

Figure 5:
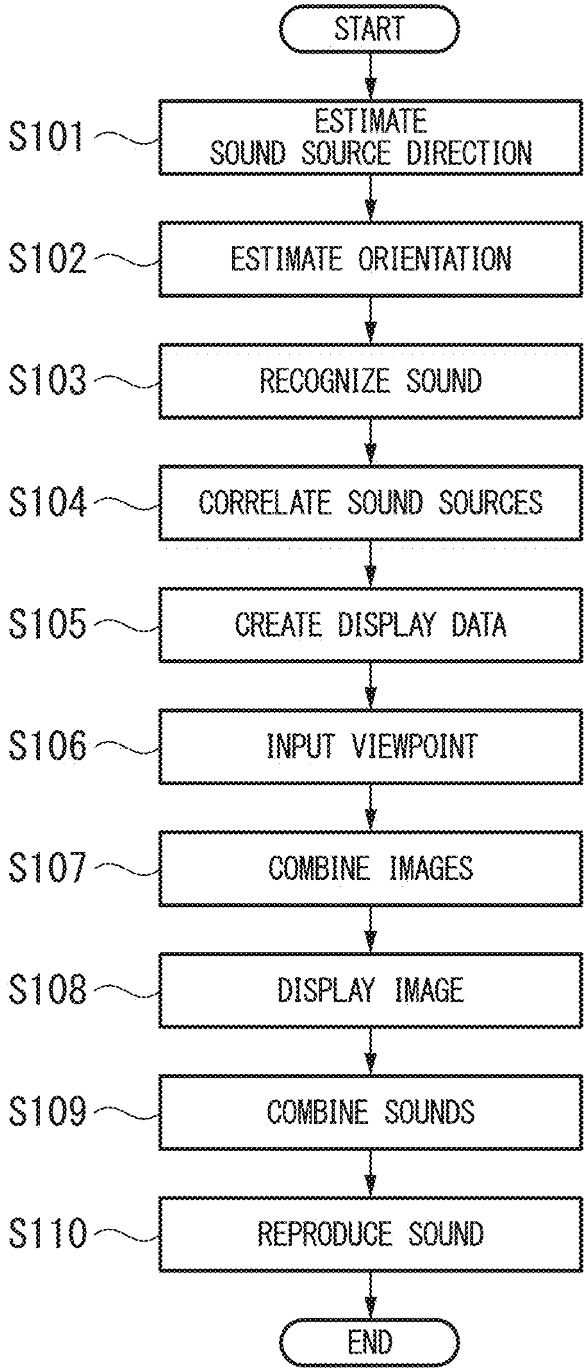
FIG. 5 is a flowchart illustrating an information displaying process in the first embodiment.

FIG. 5 is a flowchart illustrating an information display process according to the first embodiment.

(Step S101) The sound source direction estimating unit 141 estimates a sound source direction of each sound source based on a sound signal input from the sound pickup unit 11 and creates a sound-source signal indicating the component based on each sound source. The sound source direction estimating unit 141 outputs the sound source direction information indicating the estimated sound source direction to the data correlating unit 145 for each sound source. The sound source direction estimating unit 141 outputs the created sound-source signals to the sound recognizing unit 143 and the sound combining unit 148 for each sound source. Thereafter, the flow of processes goes to step S102.

(Step S102) The orientation estimating unit 142 estimates the orientation and the position of each sound source based on the sound signal input from the sound pickup unit 12. The orientation estimating unit 142 correlates the orientation information indicating the estimated orientation and the position information indicating the position and outputs the correlated result to the data correlating unit 145. Thereafter, the flow of processes goes to step S103.

(Step S103) The sound recognizing unit 143 recognizes the content of an utterance indicated by the sound-source signal for each sound source input from the sound source direction estimating unit 141 for each utterance interval. The sound recognizing unit 143 outputs the sound recognition information indicating the content of an utterance to the display data creating unit 146. Thereafter, the flow of processes goes to step S104.

(Step S104) The data correlating unit 145 correlates the sound source based on the sound source direction information input from the sound source direction estimating unit 141 with the sound source based on the orientation information and the position information input from the orientation estimating unit 142. Then, the data correlating unit 145 correlates the sound source direction information with the orientation information for each sound source which is determined to be identical and outputs the correlated result to the display data creating unit 146 and the image combining unit 147. Thereafter, the flow of processes goes to step S105.

(Step S105) The display data creating unit 146 reads arrow data as symbol data from the storage unit of the display data creating unit 146, when the orientation information input from the data correlating unit 145 represents the estimation is enabled. The display data creating unit 146 reads speech balloon data as symbol data when the orientation information represents that the estimation is disabled.

Then, the display data creating unit 146 arranges a character string indicating the sound recognition information input from the sound recognizing unit 143 in the character display area of the symbol data and creates display data indicating the symbol in which the character string is arranged.

The display data creating unit 146 creates arrangement position information indicating the position at which the display data is arranged for each sound source based on the position information input from the data correlating unit 145. The display data creating unit 146 correlates the created display data and the created arrangement position information for each sound source and outputs the correlated result to the image combining unit 147.

When the symbol indicated by the display data is an arrow, the display data creating unit 146 outputs the orientation information of the corresponding sound source input from the data correlating unit 145 to the image combining unit 147. Thereafter, the flow of processes goes to step S106.

(Step S106) The data input unit 151 outputs the viewpoint information input through a user's operation to the image combining unit 147 and the sound combining unit 148. Thereafter, the flow of processes goes to step S107.

(Step S107) The image combining unit 147 creates display data arrangement information in which the symbol indicated by the display data input from the display data creating unit 146 is arranged at the arrangement position indicated by the arrangement position information. When the symbol indicated by the display data is an arrow, the image combining unit 147 arranges the arrow so that the arrow is directed to the orientation based on the orientation information input from the data correlating unit 145. Then, the image combining unit 147 creates a display data image signal indicating the image of the symbol observed from the viewpoint of the imaging unit 13 based on the created display data arrangement information. The image combining unit 147 combines the display data image signal and the image signal input from the imaging unit 13 to synthesize a display image signal so that the created display data image signal has a priority. By causing the display data image signal to have a priority, the image indicated by the display data is not hidden by the captured image but is displayed.

The image combining unit 147 converts the coordinates of the resultant display image signal and creates a display image signal observed from the viewpoint indicated by the viewpoint information input from the data input unit 151. Then, the image combining unit 147 outputs the created display image signal to the image display unit 152. Thereafter, the flow of processes goes to step S108.

(Step S108) The image display unit 152 displays the image indicated by the display image signal input from the information processing unit 144. Thereafter, the flow of processes goes to step S109.

(Step S109) The sound combining unit 148 calculates a sound source direction of the sound source position indicated by the sound source direction input from the sound source direction estimating unit 141 from the viewpoint indicated by the viewpoint information input from the data input unit 151. Then, the sound combining unit 148 reads the head related transfer functions of the right and left channels corresponding to the calculated sound source direction from the storage unit. The sound combining unit 148 performs a convolution operation of convolving the read head related transfer functions of the right and left channels on the sound-source signal of the corresponding sound source input from the sound source direction estimating unit 141. The sound combining unit 148 combines the sound signals of the right and left channels by adding the sound-source signals created for the sound sources for each channel. The sound combining unit 148 outputs the combined sound signal of the right and left channels to the sound reproducing unit 153. Thereafter, the flow of processes goes to step S110.

(Step S110) The sound reproducing unit 153 reproduces sounds indicated by the sound signals of the right and left channels input from the sound combining unit 148 in parallel for each channel. Thereafter, the flow of processes is ended.

Example of Display Image

An example of an image displayed on the image display unit 152 will be described below.

Figure 6:
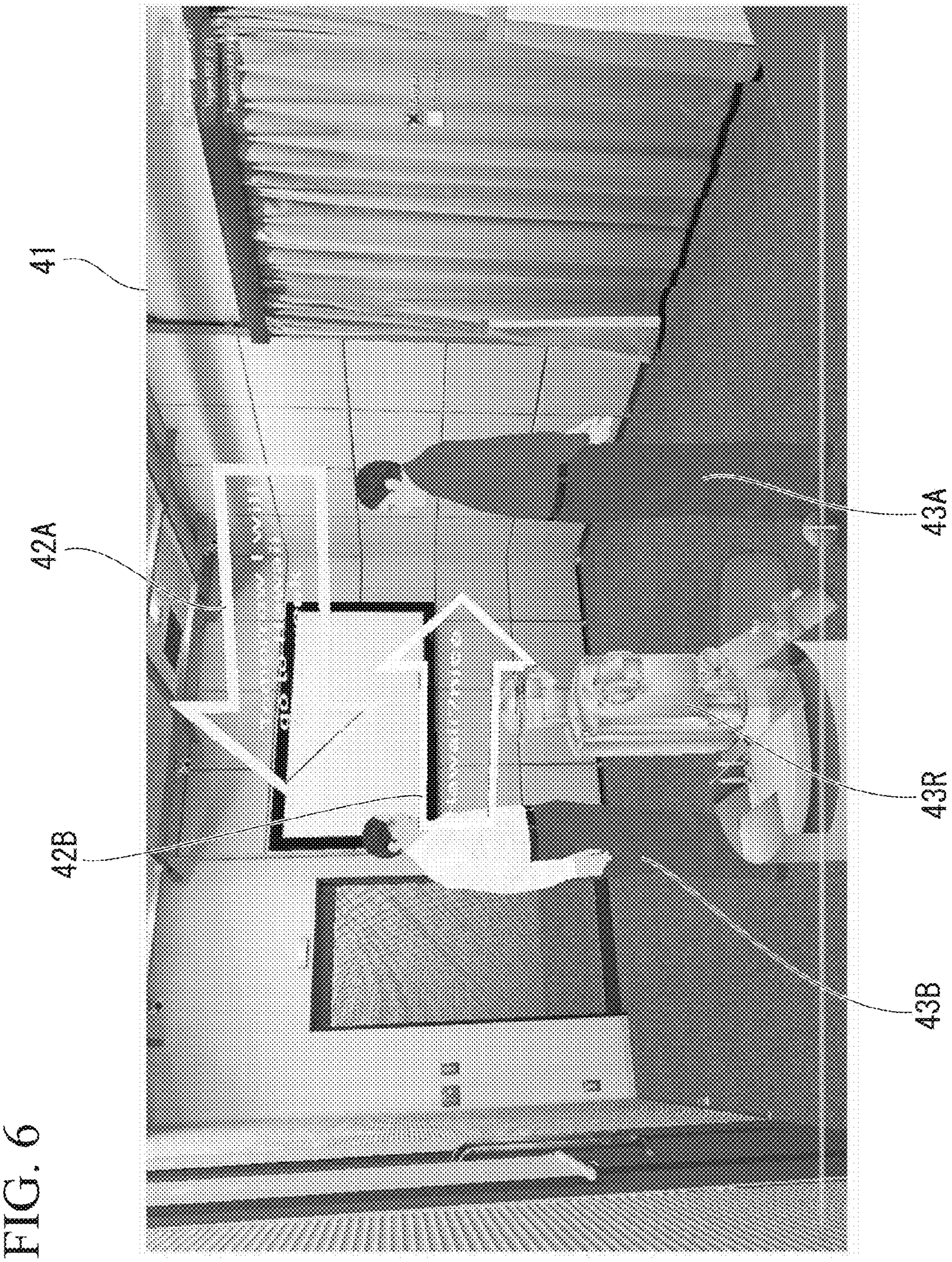
FIG. 6 is a diagram illustrating an example of an image displayed on an image display unit.

FIG. 6 shows an example of an image displayed on the image display unit 152.

In FIG. 6, the horizontal direction represents the horizontal direction with respect to the optical axis of the optical system of the imaging unit 13 and the vertical direction represents the height.

An image 41 shown in FIG. 6 is a display image in which arrows 42A and 42B (arrow images) indicated by the display data created by the display data creating unit 146 and an image signal, which is the other part, captured by the imaging unit 13 are combined. Persons 43A and 43B appear on both horizontal sides of the center of the image 41. The persons 43A and 43B correspond to sound sources. The arrows 42A and 42B are arranged so that the reference points of the arrows 42A and 42B are located just above or just below the heads of the persons 43A and 43B. A humanoid robot 43R having the sound pickup unit 11 and the imaging unit 13 built in the head thereof appears at the center of the image 41.

The arrow 42A having a start point just above the right person 43A is directed to the left with respect to the person 43A. The arrow 42A represents that the person 43A utters a speech to the left person 43B. The character string "Tomorrow I will go to Hawaii for week" surrounded with the arrow 42A is a character string indicating the sound recognition information on the speech uttered by the person 43A. Accordingly, this arrow represents the person 43A talks to the person 43B, "Tomorrow I will go to Hawaii for week".

The arrow 42B having a start point just below the left person 43B is directed to the right with respect to the person 43B. The arrow 42B represents that the person 43B utters a speech to the right person 43A. The character string "Hawaii? nice" surrounded with the arrow 42B is a character string indicating the sound recognition information on the speech uttered by the person 43B. Accordingly, the arrow 42B represents that the person 43B responses to the person 43A with a sound, "Hawaii? Nice".

Therefore, according to the first embodiment, a viewer can collectively intuitively understand the speaker, the content of an utterance, and the opposite speaker by visually recognizing the character strings indicating the content of an utterance of the persons 43A and 43B as sound sources and the direction of utterance. A viewer can easily identify the utterer for each content of utterance. For example, a hearing-impaired person can promote communication by viewing the image shown in FIG. 6.

When the person 43A utters a speech to the person 43B, the image of a speech balloon may be displayed instead of the arrow 42A in FIG. 6. In this case, information (for example, person 43A→person 43B) indicating the direction of utterance of the utterer may be displayed in addition to the character string indicating the content of an utterance.

Modified Example 1-1

Modified Example 1-1 of the first embodiment will be described below with the same elements and processes as the above-mentioned embodiment referenced by the same reference numerals.

Figure 7:
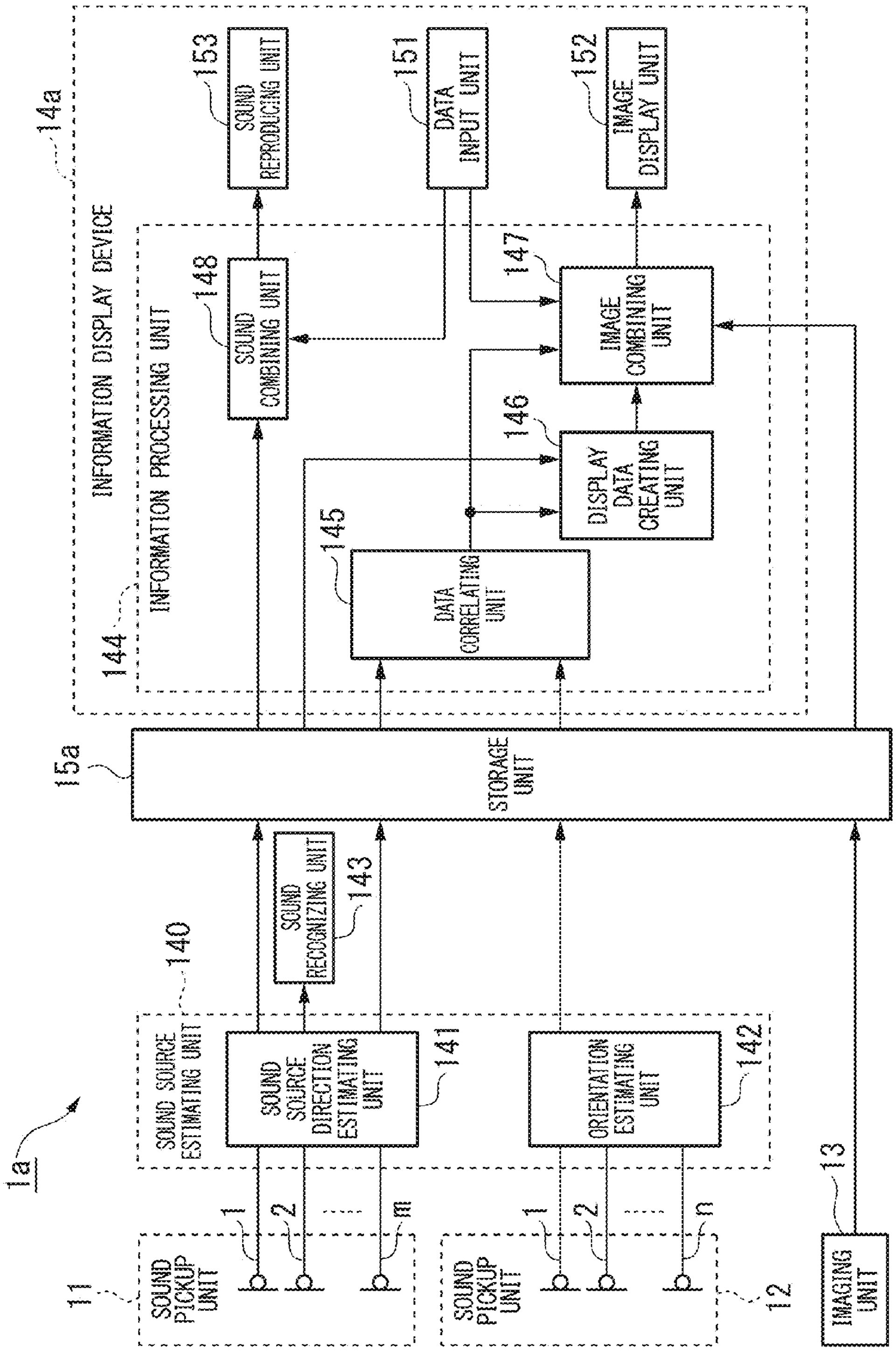
FIG. 7 is a diagram schematically illustrating the configuration of an information display system according to a modified example of the first embodiment.

FIG. 7 is a diagram schematically illustrating the configuration of an information display system 1*a* according to Modified Example 1-1.

The information display system 1*a* further includes a storage unit 15*a* in addition to the information display system 1 (FIG. 1). An information display device 14*a* has a configuration in which the sound source direction estimating unit 141, the orientation estimating unit 142, and the sound recognizing unit 143 are removed from the information display device 14 (FIG. 1).

The storage unit 15*a* stores the sound source direction information and the sound-source signal input from the sound source direction estimating unit 141, the orientation information and the position information input from the orientation estimating unit 142, the sound recognition information input from the sound recognizing unit 143, and the image signal input from the imaging unit 13. The storage unit 15*a* stores the input signals and information in correlation with the input time.

The data correlating unit 145 reads the sound source direction information, the orientation information, and the position information from the storage unit 15*a*, without receiving the information from the sound source direction estimating unit 141 or the orientation estimating unit 142. The display data creating unit 146 reads the sound recognition information from the storage unit 15*a* without receiving the information from the sound recognizing unit 143.

The sound combining unit 148 reads the sound source direction information and the sound-source signal from the storage unit 15*a* without receiving the information or signal from the sound source direction estimating unit 141.

Modified Example 1-2

Modified Example 1-2 of the first embodiment will be described below with the same elements and processes as the above-mentioned embodiment referenced by the same reference numerals.

Figure 8:
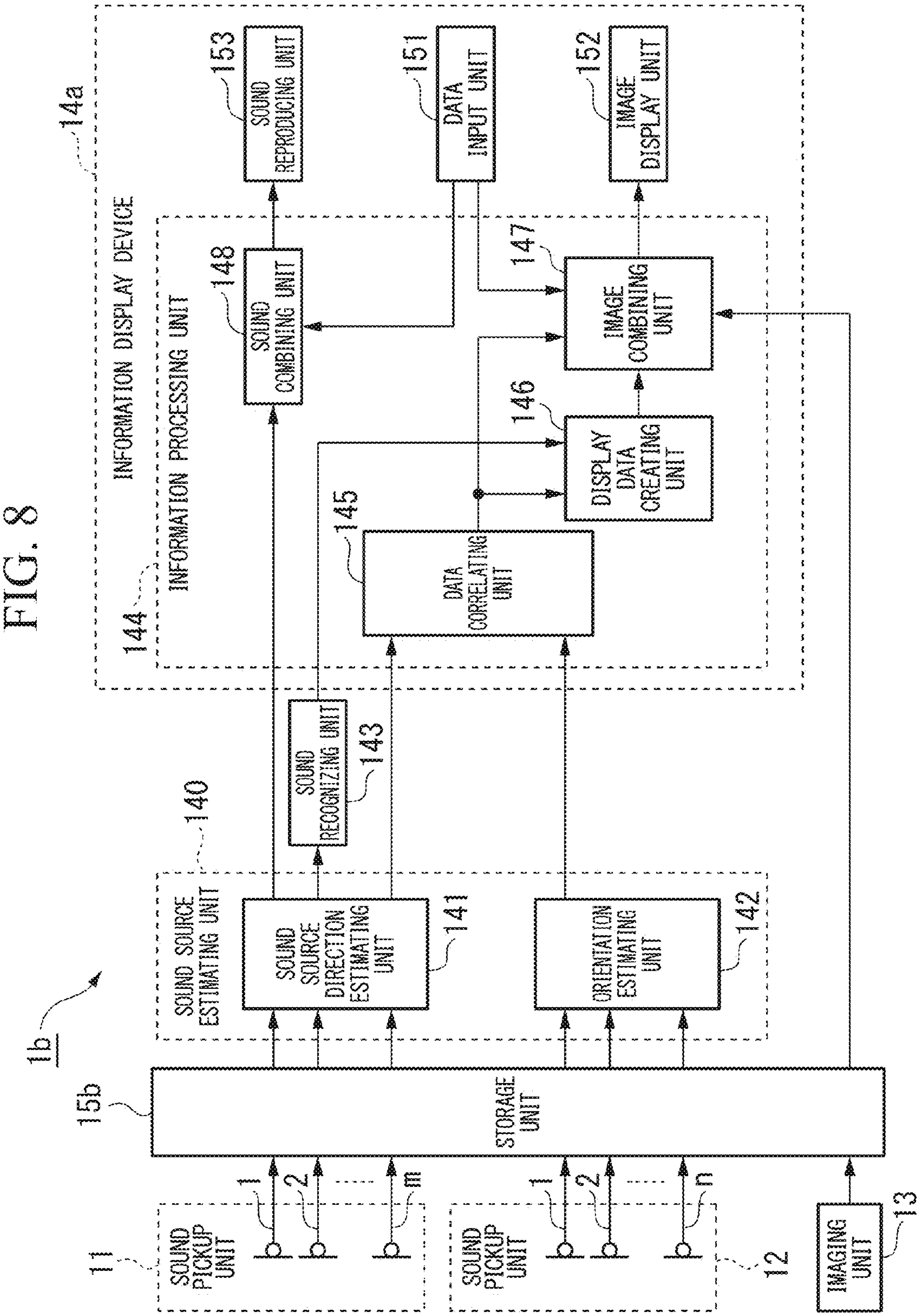
FIG. 8 is a diagram schematically illustrating the configuration of an information display system according to another modified example of the first embodiment.

FIG. 8 is a diagram schematically illustrating the configuration of an information display system 1*b* according to Modified Example 1-2.

The information display system 1*b* further includes a storage unit 15*b* in addition to the information display system 1 (FIG. 1).

The storage unit 15*b* stores the sound signal input from the sound pickup units 11 and 12 and the image signal input from the imaging unit 13 in correlation with each input time.

The sound source direction estimating unit 141 and the orientation estimating unit 142 reads the sound signal input from the sound pickup units 11 and 12 from the storage unit 15*b* without receiving the sound signal from the sound pickup unit 11.

The image combining unit 147 reads the image signal input from the imaging unit 13 from the storage unit 15*b* without receiving the image signal from the imaging unit 13.

In Modified Examples 1-1 and 1-2, even when not sequentially processing the sound signals input from the sound pickup units 11 and 12 or the image signals input from the imaging unit 13, the processed image signals can be output to the image display unit 152 and the processed sound signals can be output to the sound reproducing unit 153. Accordingly, in this embodiment, the recorded sound signals or the recorded image signals can be used and the excessive increase in processing load can be avoided.

In Modified Examples 1-1 and 1-2, the amount of information of the sound signals input from the sound pickup units 11 and 12 or the image signals input from the imaging unit 13 may be compressed and the sound signals or image signals of which the amount of information is compressed may be stored in the storage units 15*a* and 15*b*. When reading the stored sound signals or image signals from the storage units 15*a* and 15*b*, the amount of information is decompressed to the amount of information before being compressed. In Modified Examples 1-1 and 1-2, it is possible to reduce the storage capacity of the storage units 15*a* and 15*b* by reconstructing the display image signal based on the sound signals or image signals of which the amount of information is decompressed.

Modified Example 1-3

Modified Example 1-3 of the first embodiment will be described below with the same elements and processes as the above-mentioned embodiment referenced by the same reference numerals.

Figure 9:
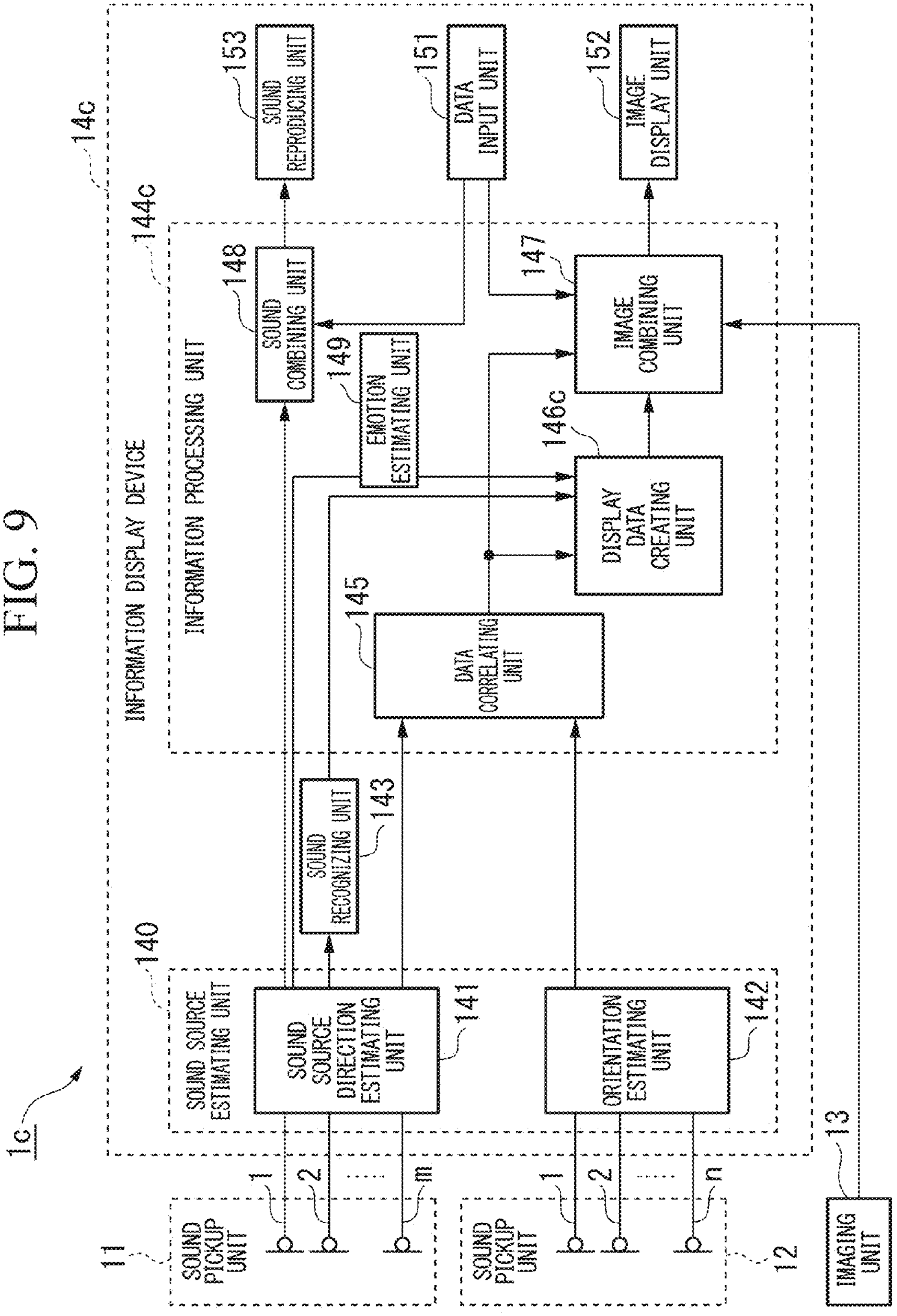
FIG. 9 is a diagram schematically illustrating the configuration of an information display system according to still another modified example of the first embodiment.

FIG. 9 is a diagram schematically illustrating the configuration of an information display system 1*c* according to Modified Example 1-3.

The information display system 1*c* further includes an emotion estimating unit 149 in addition to the information display system 1 (FIG. 1) and includes a display data creating unit 146*c* instead of the display data creating unit 146.

That is, in the information display system 1*c*, the information display device 14*c* and the information processing unit 144*c* include an emotion estimating unit 149 and a display data creating unit 146*c*, respectively, compared with the information display device 14 and the information processing unit 144 (FIG. 1).

The emotion estimating unit 149 includes a storage unit in which a sound feature vector including a set of feature quantities and emotion information are stored in advance in correlation with each other. Examples of the emotion indicated by the emotion information stored in the storage unit include excitement, rest, and neutrality.

The emotion estimating unit 149 calculates a sound feature quantity for the sound-source signal input from the sound source direction estimating unit 141 and reads the emotion information corresponding to the calculated sound feature quantity from the storage unit of the emotion estimating unit 149. The sound feature quantity calculated by the emotion estimating unit 149 is a set of all or a part of an average pitch (an average value of the pitches included in each predetermined interval), an average level (an average value of the levels included in each predetermined interval), an average pitch variation rate (a variation rate crossing sub-intervals to the average value of pitches included in a plurality of sub-intervals included in each predetermined interval), an average level variation rate (a variation rate crossing sub-intervals to the average value of levels included in a plurality of sub-intervals included in each predetermined interval), a pitch index (an average value of pitches in all the input intervals of a predetermined average pitch), and a level index (an average value of levels in all the input intervals of a predetermined average pitch). The emotion estimating unit 149 constructs a sound feature vector having sound feature quantities including such a set as elements.

The emotion estimating unit 149 calculates index values indicating the similarity to the constructed sound feature vector and the sound feature vectors stored in the storage, for example, an Euclidean distance. The emotion estimating unit 149 reads the emotion information corresponding to the sound feature vector of which the calculated index value is the minimum from the storage unit and outputs the read emotion information to the display data creating unit 146*c*.

The emotion estimating unit 149 may detect parts of a person's face as a sound source from the image signal input from the imaging unit 13 through the use of a known image processing method and may estimate the emotion information corresponding to the positional relationship between the parts. The emotion estimating unit 149 may receive a myoelectric potential signal of a person as a sound source and may estimate the emotion information using a known emotion estimating method based on the received myoelectric potential signal.

The display data creating unit 146*c* has the same configuration as the display data creating unit 146. The differences from the display data creating unit 146 will be mainly described.

The storage unit of the display data creating unit 146*c* stores symbol data (direction indicating symbol data and direction non-indicating symbol data) for each emotion information in advance. The display form of the symbol data differs depending on the emotion information. Examples of the display form include the shape of the outer edge, the line width, the brightness, and the color.

For example, in a display form when the emotion information indicates the excitement, at least a part of the outer edge of a symbol has a saw-teeth shape and the line width is greater or the brightness is higher than that when the emotion information indicates the neutrality. For example, in a display form when the emotion information indicates the rest, at least a part of the outer edge of a symbol has a shape including a repeated cloud form and the line width is greater or the brightness is higher than that when the emotion information indicates the neutrality. The display colors when the emotion information indicates the excitement, the rest, and the neutrality are red, light blue, and yellow, respectively.

The display data creating unit 146*c* reads the emotion information input from the emotion estimating unit 149 and the symbol data corresponding to the enabling or disabling of the orientation estimation indicated by the input orientation information from the storage unit. The display data creating unit 146*c* arranges a character string indicating the input sound recognition information in the character display area of the read symbol data. When the line width, the brightness, and the color vary in the display form of each emotion information, the display data creating unit 146*c* may arrange the character string in the display form corresponding to the emotion information.

Accordingly, in Modified Example 1-3, a viewer can understand the emotion of a speaker as a sound source by visually recognizing the display form of the symbol. In Modified Example 1-3, by displaying the symbol in a display form attracting a viewer's attention for specific emotion, for example, the excitement, it is possible to change the degree of attention of a viewer depending on a speaker's emotion.

Example of Image of Arrow Indicated by Symbol Data

An example of the shape of an image of an arrow will be described as a display form of a symbol.

Figure 10:
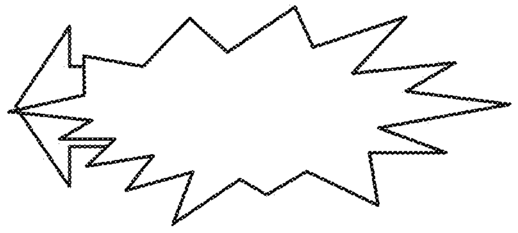
FIG. 10 is a diagram illustrating an example of the shape of an arrow image in the modified examples.

FIG. 10 is a diagram illustrating an example of the shape of the image of an arrow in Modified Example 1-3.

The arrow shown in FIG. 10 includes a triangle of which the vertex is directed to the left side and a line drawing of which the outer edge is saw-teethed. By displaying this shape of arrow, a speaker's emotion (excitement) along with the sound source direction, that is, the direction in which the speaker utters a speech, is visually expressed.

Figure 11:
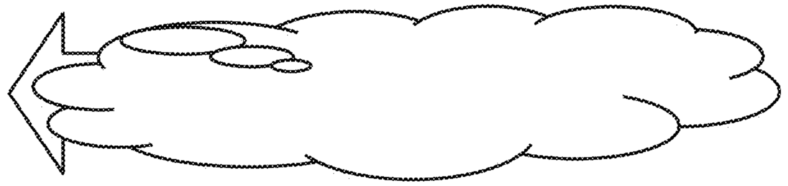
FIG. 11 is a diagram illustrating another example of the shape of an arrow image in the modified examples.

FIG. 11 is a diagram illustrating an example of the shape of the image of an arrow in Modified Example 1-3.

The arrow shown in FIG. 11 includes a triangle of which the vertex is directed to the left side and a line drawing of which a cloud form is repeated. By displaying this shape of arrow, a speaker's emotion (rest) along with the direction in which the speaker utters a speech, is visually expressed.

Modified Example 1-4

Modified Example 1-4 of the first embodiment will be described below with the same elements and processes as the above-mentioned embodiment referenced by the same reference numerals.

Figure 12:
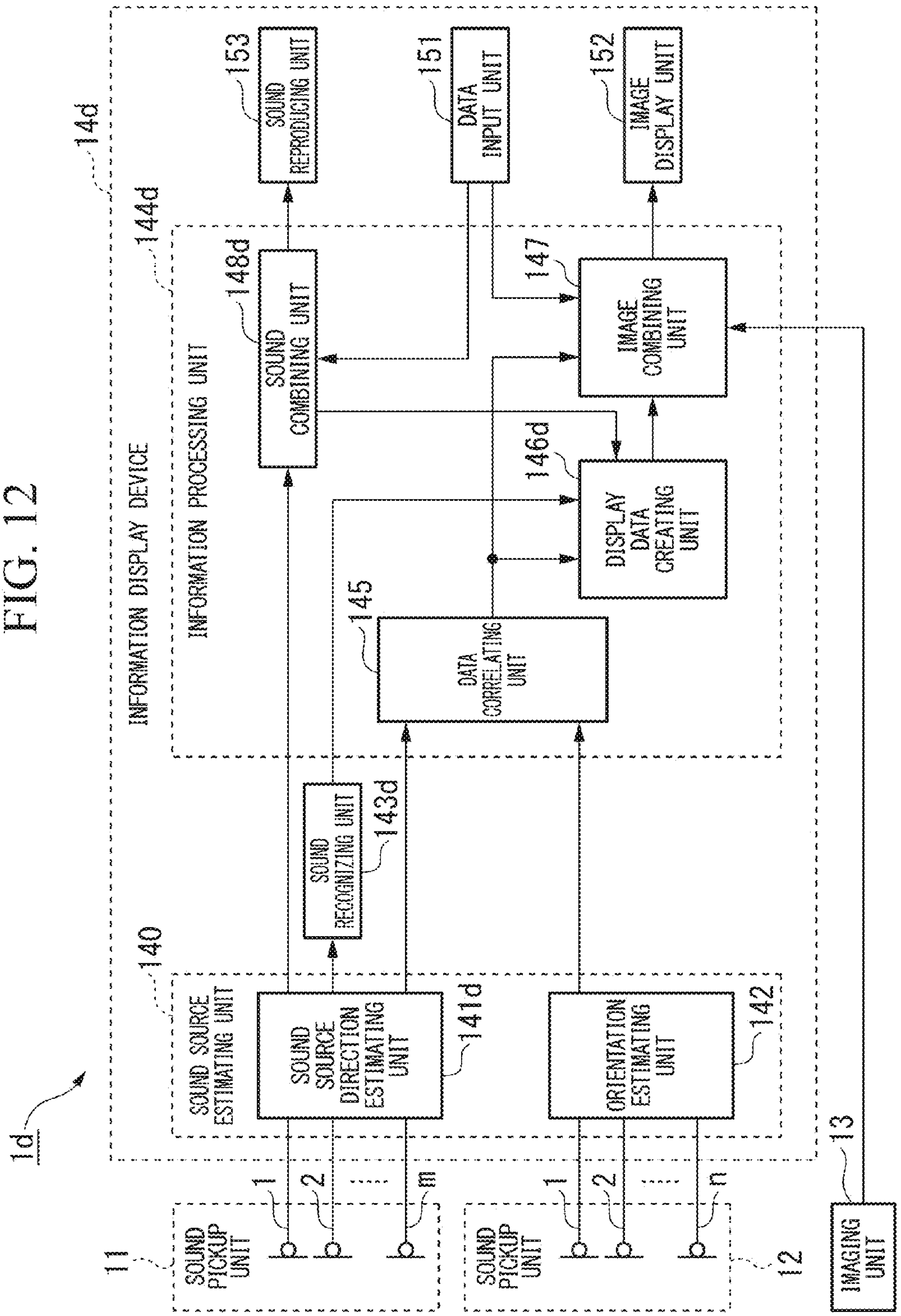
FIG. 12 is a diagram schematically illustrating the configuration of an information display system according to still another modified example of the first embodiment.

FIG. 12 is a diagram schematically illustrating the configuration of an information display system 1*d* according to Modified Example 1-4.

The information display system 1*d* includes a sound source direction estimating unit 141*d*, a sound recognizing unit 143*d*, a display data creating unit 146*d*, and a sound combining unit 148*d* instead of the sound source direction estimating unit 141, the sound recognizing unit 143, the display data creating unit 146, and the sound combining unit 148 in the information display system 1 (FIG. 1). In the information display system 1*d*, a information display device 14*d* includes the sound source direction estimating unit 141*d*, the sound recognizing unit 143*d*, and the information processing unit 144*d*. The information processing unit 144*d* includes the display data creating unit 146*d* and the sound combining unit 148*d*.

The sound source direction estimating unit 141*d*, the sound recognizing unit 143*d*, the display data creating unit 146*d*, and the sound combining unit 148*d* have the same configurations as the sound source direction estimating unit 141, the sound recognizing unit 143, the display data creating unit 146, and the sound combining unit 148, respectively. The differences from the sound source direction estimating unit 141, the sound recognizing unit 143, the display data creating unit 146, and the sound combining unit 148 will be mainly described below.

The display data creating unit 146*d* displays characters or words corresponding to phonemes in the interval output to the sound reproducing unit 153 out of the sound-source signal for each sound source in a form different from the other characters or words. Examples of the different form include color, font size, font width, decoration, presence or difference of background color or texture.

Here, the sound source direction estimating unit 141*d* creates time information indicating the time of creating the sound-source signal every predetermined time (for example, 50 ms) and outputs the created time information to the sound recognizing unit 143*d* and the sound combining unit 148*d* in correlation with the sound-source signal.

The sound recognizing unit 143*d* outputs the time information input from the sound source direction estimating unit 141*d* to the display data creating unit 146*d* in correlation with the characters indicating the sound recognition information. The sound combining unit 148*d* receives the sound-source signal and the time information in correlation with each other from the sound source direction estimating unit 141*d* and delays the input sound-source signal by a predetermined delay time (for example, 5 seconds). The sound combining unit 148*d* outputs the time information correlated with the sound-source signal to the display data creating unit 146*d* when outputting the delayed sound-source signal to the sound reproducing unit 153. The display data creating unit 146*d* sets the characters corresponding to the time information input from the sound combining unit 148*d* as characters to be displayed in the different form.

In this manner, in the first embodiment, display image data in which the characters indicating the content of an utterance and the symbol surrounding the characters and indicating a direction are displayed at a position corresponding to the sound source of the content of an utterance indicated by the characters surrounded with the symbol so as to be directed to the orientation in which the sound source radiates a sound wave in the direction is created. Accordingly, a viewer can collectively intuitively understand a speaker's position, the content of an utterance, and the direction of utterance.

The examples of the symbol in the first embodiment are shown in FIGS. 3, 4, 10, and 11, but the invention is not limited to the examples. For example, when the number of characters displayed in a symbol is larger a predetermined number of characters, such a character string may be displayed using a plurality of symbols in this embodiment. In this case, in the a plurality of symbols to be displayed, a character string obtained later as the recognition result may be displayed larger and a character string obtained earlier as the recognition result may be displayed smaller. All the characters included in a character string may be displayed in a symbol with a reduced font size.

Second Embodiment

A second embodiment of the invention will be described below with reference to the drawing with the same elements and processes as described above referenced by the same reference numerals.

Figure 13:
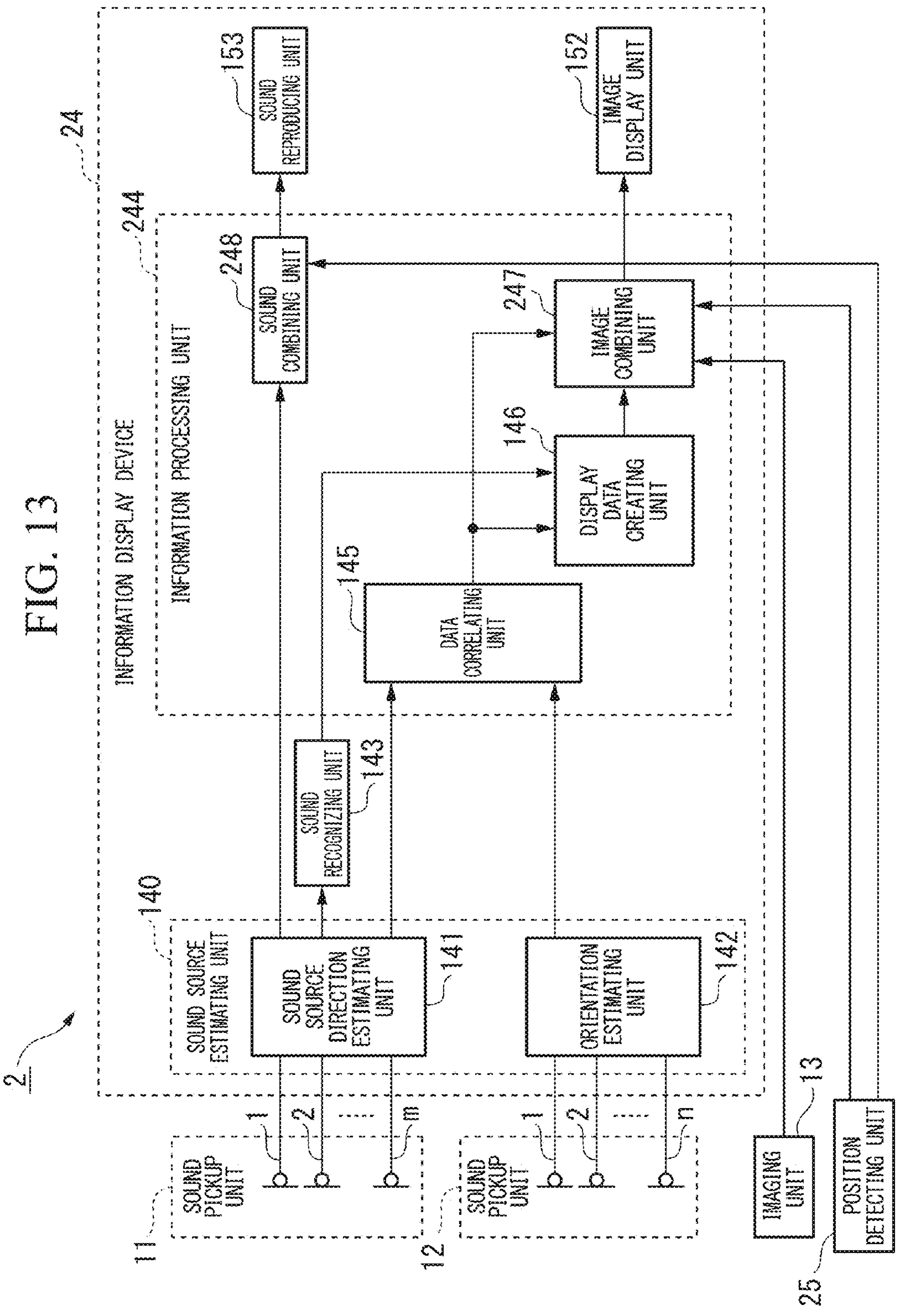
FIG. 13 is a conceptual diagram illustrating the configuration of an information display system according to a second embodiment of the invention.

FIG. 13 is a conceptual diagram illustrating the configuration of an information display system 2 according to the second embodiment.

The information display system 2 includes an information display device 24 instead of the information display device 14 in the information display system 1 (FIG. 1) and further includes a position detecting unit 25.

The position detecting unit 25 includes a position sensor detecting the position of the position detecting unit 25, for example, a magnetic sensor. The position detecting unit 25 creates detection position information indicating the detected position and outputs the created detection position information to the information processing unit 244.

The position detecting unit 25 may be incorporated into the same chassis as the sound pickup unit 11, the imaging unit 13, the image display unit 152, and the sound reproducing unit 153. For example, the position detecting unit 25 may be built in a head-mounted display into which these are incorporated. Accordingly, the position detecting unit 25 can detect the position of a viewer mounted with the head-mounted display. The sound source direction estimating unit 141 can estimate the sound source direction with respect to the position of the viewer.

The information display device 24 includes an information processing unit 244 instead of the information processing unit 144 (FIG. 1) in the information display device 14 (FIG. 1). The information processing unit 244 includes an image combining unit 247 and a sound combining unit 248 instead of the image combining unit 147 and the sound combining unit 148 in the information processing unit 144 (FIG. 1). The image combining unit 247 and the sound combining unit 248 include the same configurations as the image combining unit 147 and the sound combining unit 148, respectively.

Here, the image combining unit 247 receives the detection position information from the position detecting unit 25 instead of receiving the viewpoint information from the data input unit 151 (FIG. 1) and creates a two-viewpoint display image signal. The image combining unit 247 performs the change of viewpoint using the received detection position information instead of the viewpoint information input from the data input unit 151. Accordingly, it is possible to create two-viewpoint display image signals having the detected position as a viewpoint.

The sound combining unit 248 receives the detection position information from the position detecting unit 25 instead of receiving the viewpoint information from the data input unit 151 (FIG. 1) and creates a two channels of sound signal. The sound combining unit 248 performs the change of viewpoint using the detected position indicated by the received detection position information instead of the viewpoint information input from the data input unit 151. Accordingly, it is possible to create two channels of sound signals having the detected position as a listening point.

Example of Display Image

An example of an image displayed on the image display unit 152.

Figure 14:
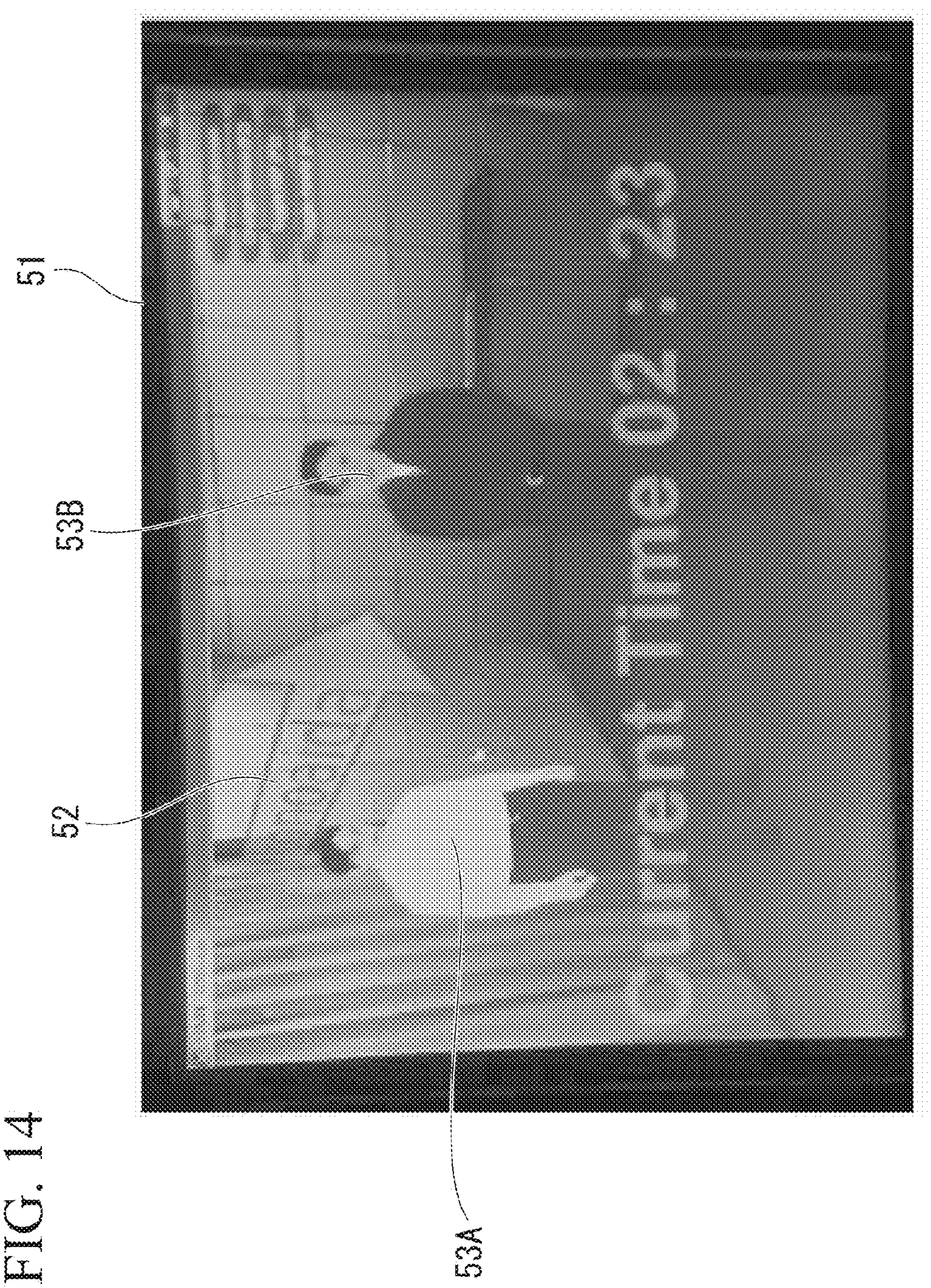
FIG. 14 is a diagram illustrating an example of an image displayed on the image display unit.

FIG. 14 shows an example of the image displayed on the image display unit 152.

Here, the display image shown in FIG. 14 is an image indicated by one viewpoint (left) display image signal out of the two-viewpoint display image signals.

In FIG. 14, the horizontal direction represents the horizontal direction with respect to a viewer mounted with the position detecting unit 25 and the vertical direction represents the height with respect to the viewer.

An image 51 shown in FIG. 14 is a display image in which display data indicating an arrow 52 created by the display data creating unit 146 and an image signal, which is the other part, captured by the imaging unit 13 are combined. Persons 53A and 53B appear on both horizontal sides of the center of the image. The left person 53A corresponds to a sound source. The arrow 52 is arranged so that the anchor point of the arrow 52 is located just above the head of the person 53A. Characters indicating the time (Current Time 02:23) at which the image is captured by the imaging unit 13 appear below the center.

The arrow 52 having a start point just above the person 53A is directed to the right side of the person 53A. The arrow 52 represents the person 53A utters a speech to the right person 53B. The character string "Konoaida" (The other day,) surrounded with the arrow is a character string indicating the sound recognition information based on the speech uttered by the person 53A. Accordingly, the arrow 52 represents that the person 53A utters "Konoaida" to the person 53B.

Therefore, according to the second embodiment, a viewer can collectively intuitively understand a speaker, the content of an utterance, and the opposite speaker by visually recognizing the character string indicating the content of an utterance made by a person as a sound source and the direction thereof at the detected position of the viewer.

When the display surface of the image display unit 152 displaying an image is a semi-transparent display transmitting external light, the image combining unit 247 may not perform the process of combining the image input from the imaging unit 13. That is, the image combining unit 247 creates a display image signal indicating an image of which the viewpoint is changed so that its own position at which the display data is detected is centered, and the image display unit 152 displays the arrow based on the display image signal.

Modified Example 2-1

Modified Example 2-1 of the second embodiment will be described below with the same elements and processes as the second embodiment referenced by the same reference numerals.

Figure 15:
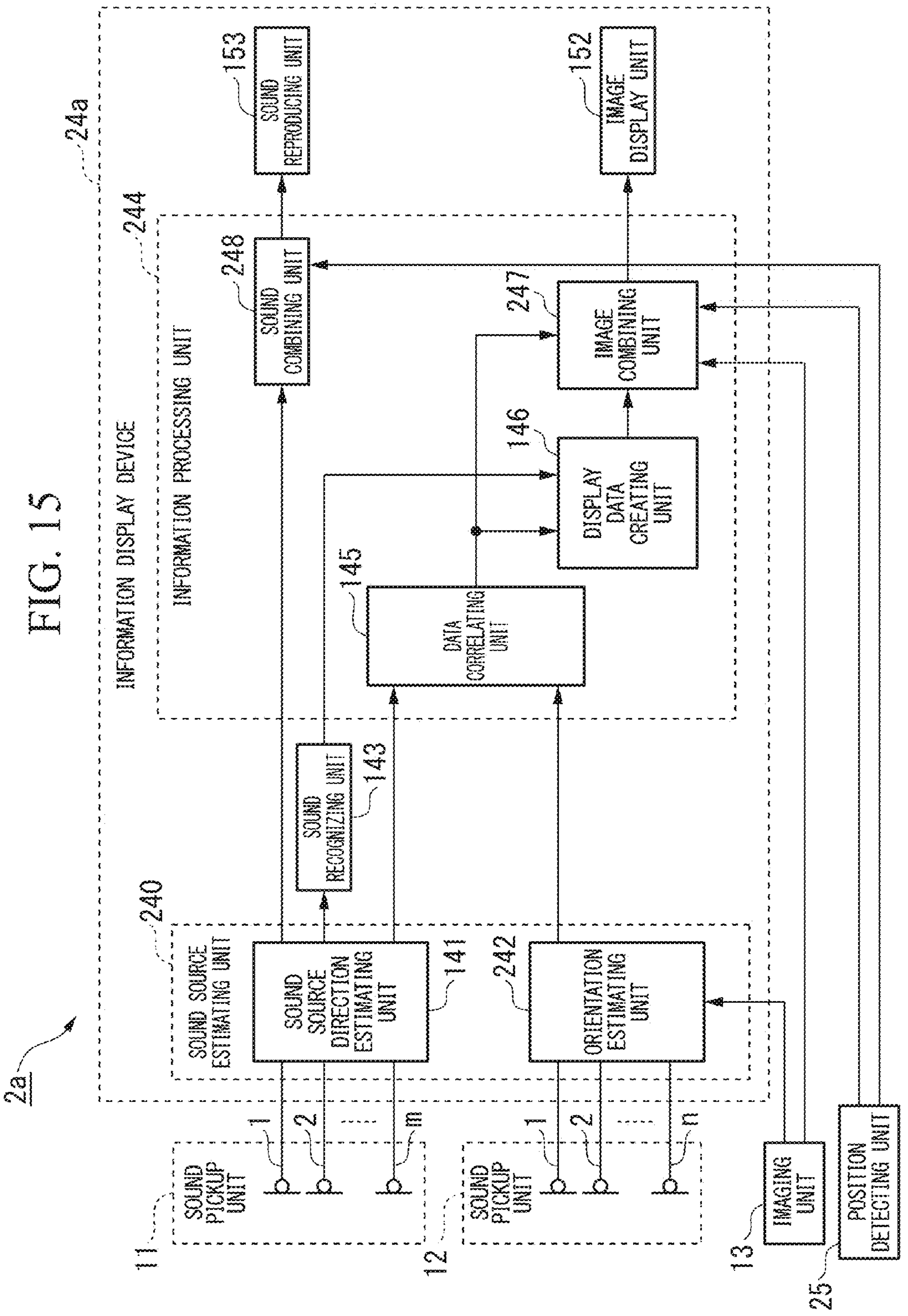
FIG. 15 is a diagram schematically illustrating the configuration of an information display system according to a modified example of the second embodiment.

FIG. 15 is a diagram schematically illustrating the configuration of an information display system 2*a* according to Modified Example 2-1.

An information display device 24*a* in the information display system 2*a* includes a sound source estimating unit 240 instead of the sound source estimating unit 140 in the information display system 2 (FIG. 13). The sound source estimating unit 240 includes a sound source direction estimating unit 141 and an orientation estimating unit 242.

The orientation estimating unit 242 detects the direction of a person's face appearing in the image indicated by the image signal input from the imaging unit 13 and estimates the detected direction as the orientation. The orientation estimating unit 242 can use a known method to detect the direction of the face appearing in the image.

The orientation estimating unit 242 includes a storage unit in which face model data including haar-like features indicating the features of parts of a person's face, for example, the left half and the right left of a face, are stored in advance. The orientation estimating unit 242 calculates the haar-like feature quantities as an index value with respect to the face model data of the parts stored in the storage unit for each area included in the image indicated by the image signal input from the imaging unit 13. The orientation estimating unit 242 determines an area in which the haar-like feature quantity calculated for each part is larger than a predetermined threshold value as an area included in the corresponding part.

The orientation estimating unit 242 calculates a ratio of the area of an area indicating the left eye and the area of an area indicating the right eye and calculates the direction of the face corresponding to the calculated ratio. The orientation estimating unit 242 outputs the orientation information including the calculated direction as the orientation and indicating the orientation to the data correlating unit 145 and the display data creating unit 146.

The orientation estimating unit 242 may detect the direction (eye direction) of the right and left eyes detected from the input image signal through the use of a known method and may determine the detected direction as the orientation. Accordingly, in Modified Example 2-1, it is possible to estimate the orientation of a sound source based on the direction of a person's face observed from the viewpoint of the imaging unit 13 without using a plurality of microphones.

In the above-mentioned embodiments, it has been stated that the image combining units 147 and 247 combine the image signal input from the imaging unit 13 and the display data created by the display data creating unit 146 and the like, but the invention is not limited to this example. The image combining units 147 and 247 may use an image signal created by particular means such as computer graphics instead of the image signal input from the imaging unit 13. The created image signal may be, for example, an image which is arranged at the sound source position estimated by the sound source estimating unit 140 and which indicates the sound source radiating a sound in the estimated orientation.

In the above-mentioned embodiments, it has been stated that the sound source estimating unit 140 includes the sound source direction estimating unit 141 and the orientation estimating unit 142 and that the sound source estimating unit 240 includes the sound source direction estimating unit 141 and the orientation estimating unit 242, but the invention is not limited to this example. The sound source estimating unit 140 may be incorporated into a body as long as it can estimate the sound source direction, the orientation, and the sound-source signal for each sound source based on a plurality of input sound signals. In this case, the data correlating unit 145 can be skipped and the sound source estimating unit 140 outputs the sound source direction information indicating the estimated sound source direction and the estimated orientation information to the display data creating units 146, 146*c*, and 146*d*, the image combining units 147 and 247, and the sound combining units 148, 148*d*, and 248.

In the above-mentioned embodiments, the modified examples and alternatives thereof may be arbitrarily combined.

A part of the information display device 14, 14*a*, 14*c*, 14*d*, 24, and 24*a* according to the above-mentioned embodiments, such as the sound source direction estimating units 141 and 141*d*, the orientation estimating unit 142 and 242, the sound recognizing units 143 and 143*d*, the data correlating unit 145, the display data creating unit 146, a46*c*, and 146*d*, the image combining units 147 and 247, and the sound combining units 148, 148*d*, and 248, may be embodied by a computer. In this case, the various units may be embodied by recording a program for performing the control functions in a computer-readable recording medium and by causing a computer system to read and execute the program recorded in the recording medium. Here, the "computer system" is built in the information display device 14, 14*a*, 14*c*, 14*d*, 24, and 24*a* and includes an OS or hardware such as peripherals. Examples of the "computer-readable recording medium" include memory devices of portable mediums such as a flexible disk, a magneto-optical disc, a ROM, and a CD-ROM, a hard disk built in the computer system, and the like. The "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

In addition, part or all of the information display device 14, 14*a*, 14*c*, 14*d*, 24; and 24*a* according to the above-mentioned embodiments may be embodied as an integrated circuit such as an LSI (Large Scale Integration). The functional blocks of the information display device 14, 14*a*, 14*c*, 14*d*, 24, and 24*a* may be individually formed into processors and a part or all thereof may be integrated as a single processor. The integration technique is not limited to the LSI, but they may be embodied as a dedicated circuit or a general-purpose processor. When an integration technique taking the place of the LSI appears with the development of semiconductor techniques, an integrated circuit based on the integration technique may be employed.

While an embodiment of the invention has been described in detail with reference to the drawings, practical configurations are not limited to the above-described embodiment, and design modifications can be made without departing from the scope of this invention.

What is claimed is:

1. An information processing device comprising:

a display data creating unit configured to create display data including characters representing contents of an utterance based on a sound and a symbol surrounding the characters and indicating a first direction;

an image acquiring unit configured to acquire an image representing the sound source of the utterance;

a data input unit configured to input a viewpoint which is a position where the image is observed; and an image combining unit configured to determine the position of the display data based on a display position of the image representing the sound source, and to combine the display data and the image of the sound source so that an orientation in which the sound is radiated is matched with the first direction, wherein the image combining unit is configured to perform a viewpoint change based on the viewpoint input from the data input unit on the display data created by the display data creating unit, and to combine the display data, of which the viewpoint is changed, with the image acquired by the image acquiring unit, and the display data creating unit is configured to determine the size of the characters representing the contents of the utterance based on a distance from the viewpoint to the position of the sound source.

2. The information processing device according to claim 1, further comprising a position detecting unit configured to detect its own position, wherein the data input unit is configured to input the position detected by the position detecting unit as the viewpoint.

3. The information processing device according to claim 1, further comprising an emotion estimating unit configured to estimate an emotion of a speaker producing the sound of the utterance, wherein the display data creating unit is configured to change the display form of the symbol based on the emotion estimated by the emotion estimating unit.

4. The information processing device according to claim 1, wherein the display data creating unit is configured to determine the time at which the symbol is displayed based on the number of characters included in the display data.

5. An information processing system comprising:

a sound source position estimating unit configured to estimate the position of a sound source;

a orientation estimating unit configured to estimate an orientation in which the sound source radiates a sound wave;

a sound recognizing unit configured to recognize contents of an utterance from the sound source;

a display data creating unit configured to create display data including characters representing the contents of the utterance recognized by the sound recognizing unit and a symbol surrounding the characters and indicating a first direction;

an image acquiring unit configured to acquire an image representing the sound source of the utterance;

a data input unit configured to input a viewpoint which is a position where the image is observed; and an image combining unit configured to determine the position of the display data based on a display position of the image representing the sound source of the utterance, and to combine the display data and the image of the sound source so that an orientation in which the sound is radiated is matched with the first direction, wherein the image combining unit is configured to perform a viewpoint change based on the viewpoint input from the data input unit on the display data created by the display data creating unit, and to combine the display data, of which the viewpoint is changed, with the image acquired by the image acquiring unit, and the display data creating unit is configured to determine the size of the characters representing the contents of the utterance based on a distance from the viewpoint to the position of the sound source.

6. The information processing system according to claim 5, further comprising an imaging unit configured to capture an image representing the sound source of the utterance.

7. An information processing method in an information processing device, comprising the steps of:

creating display data including characters representing contents of an utterance based on a sound and a symbol surrounding the characters and indicating a first direction;

acquiring an image representing the sound source of the utterance;

inputting a viewpoint which is a position where the image is observed; and determining the position of the display data based on a display position of the image representing the sound source of the utterance and combining the display data and the image of the sound source so that an orientation in which the sound is radiated is matched with the first direction, wherein, in the step of combining the display data and the image of the sound source, a viewpoint change is performed based on the viewpoint on the display data, and the display data, of which the viewpoint is changed, are combined with the image representing the sound source, and in the step of creating display data, the size of the characters representing the contents of the utterance is determined based on a distance from the viewpoint to the position of the sound source.

* * * * *

UNITED STATES PATENT AND TRADEMARK OFFICE

CERTIFICATE OF CORRECTION

PATENT NO. : 8,886,530 B2
APPLICATION NO. : 13/529585
DATED : November 11, 2014
INVENTOR(S) : Kazuhiro Nakadai It is certified that error appears in the above-identified patent and that said Letters Patent is hereby corrected as shown below:

Title page, item (60) Related U.S. Application Data, "Feb. 24, 2011" should be --June 24, 2011--

Signed and Sealed this
Seventeenth Day of February, 2015

Michelle K. Lee
*Deputy Director of the United States Patent and Trademark Office*